Sept. 18, 1956 H. V. KINDSETH 2,763,458
MECHANISM FOR FILLING AND CLOSING FLEXIBLE CONTAINERS
Filed Sept. 5, 1950 16 Sheets-Sheet 1

INVENTOR.
HAROLD V. KINDSETH
BY
Paul, Paul & Moore
ATTORNEYS

Sept. 18, 1956 H. V. KINDSETH 2,763,458

MECHANISM FOR FILLING AND CLOSING FLEXIBLE CONTAINERS

Filed Sept. 5, 1950 16 Sheets-Sheet 2

INVENTOR.
HAROLD V. KINDSETH
BY
Paul, Paul & Moore
ATTORNEYS

INVENTOR.
HAROLD V. KINDSETH
BY Paul, Paul & Moore
ATTORNEYS

MECHANISM FOR FILLING AND CLOSING FLEXIBLE CONTAINERS

Filed Sept. 5, 1950

16 Sheets-Sheet 4

INVENTOR.
HAROLD V. KINDSETH
BY
Paul, Paul & Moore
ATTORNEYS

INVENTOR.
HAROLD V. KINDSETH
BY
Paul, Paul & Moore
ATTORNEYS

Sept. 18, 1956 H. V. KINDSETH 2,763,458

MECHANISM FOR FILLING AND CLOSING FLEXIBLE CONTAINERS

Filed Sept. 5, 1950 16 Sheets-Sheet 6

INVENTOR.
HAROLD V. KINDSETH
BY Paul, Paul & Moore
ATTORNEYS

INVENTOR.
HAROLD V. KINDSETH
BY Paul, Paul & Moore
ATTORNEYS

Sept. 18, 1956 H. V. KINDSETH 2,763,458

MECHANISM FOR FILLING AND CLOSING FLEXIBLE CONTAINERS

Filed Sept. 5, 1950 16 Sheets-Sheet 8

INVENTOR.
HAROLD V. KINDSETH
BY Paul, Paul & Moore
ATTORNEYS

Sept. 18, 1956 H. V. KINDSETH 2,763,458
MECHANISM FOR FILLING AND CLOSING FLEXIBLE CONTAINERS
Filed Sept. 5, 1950 16 Sheets-Sheet 9

INVENTOR.
HAROLD V. KINDSETH
BY
Paul, Paul & Moore
ATTORNEYS

INVENTOR.
HAROLD V. KINDSETH
BY
Paul, Paul & Moore
ATTORNEYS

Sept. 18, 1956 H. V. KINDSETH 2,763,458

MECHANISM FOR FILLING AND CLOSING FLEXIBLE CONTAINERS

Filed Sept. 5, 1950

16 Sheets-Sheet 11

INVENTOR.
HAROLD V. KINDSETH
BY Paul, Paul & Moore
ATTORNEYS

Sept. 18, 1956 H. V. KINDSETH 2,763,458

MECHANISM FOR FILLING AND CLOSING FLEXIBLE CONTAINERS

Filed Sept. 5, 1950 16 Sheets-Sheet 12

INVENTOR.
HAROLD V. KINDSETH
BY Paul, Paul & Moore
ATTORNEYS

Sept. 18, 1956 H. V. KINDSETH 2,763,458

MECHANISM FOR FILLING AND CLOSING FLEXIBLE CONTAINERS

Filed Sept. 5, 1950 16 Sheets-Sheet 13

INVENTOR.
HAROLD V. KINDSETH
BY Paul, Paul & Moore
ATTORNEYS

INVENTOR.
HAROLD V. KINDSETH
BY Paul, Paul & Moore
ATTORNEYS

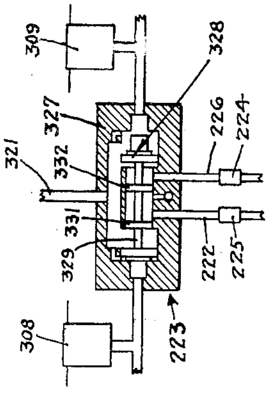
FIG. 28
FIG. 27-A
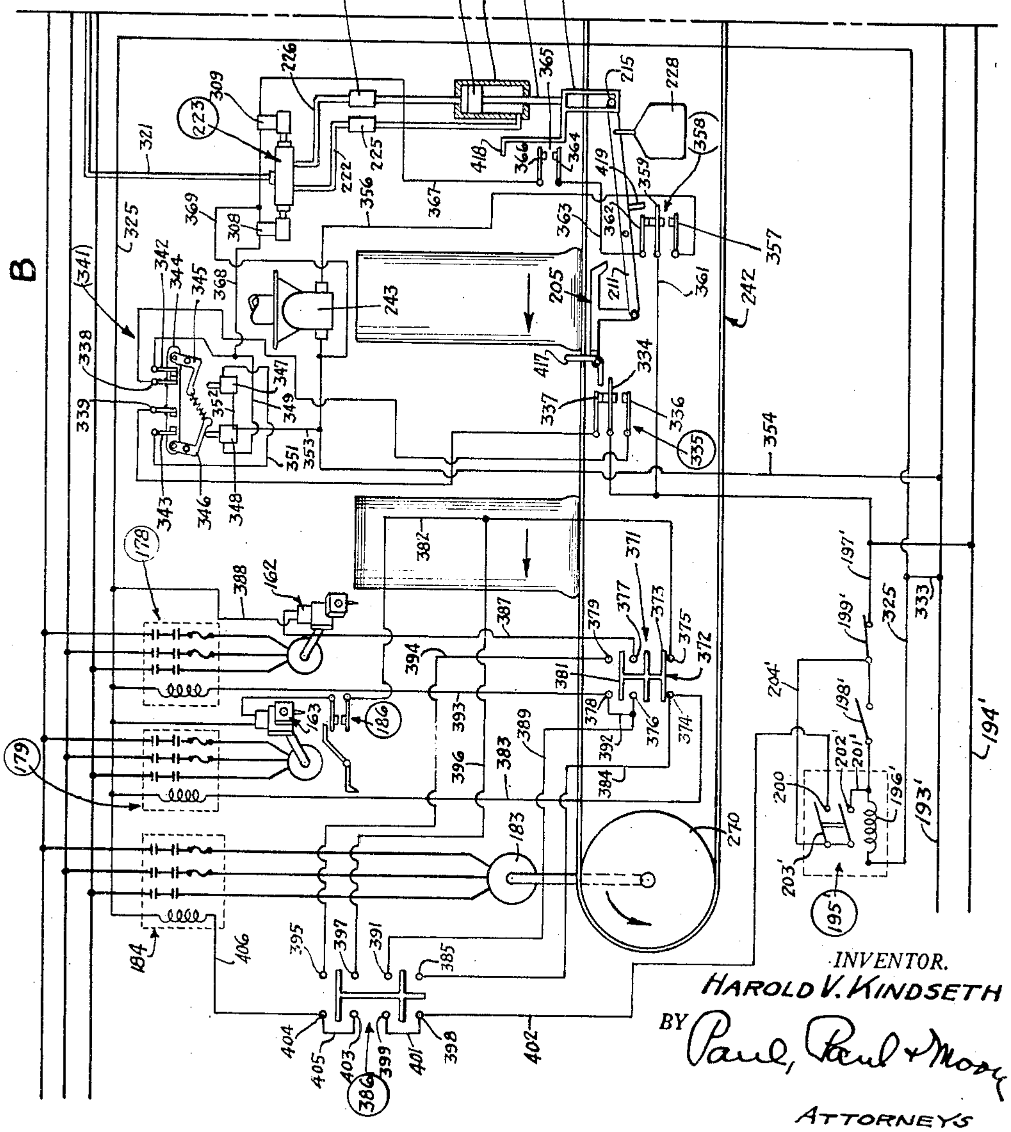
INVENTOR.
HAROLD V. KINDSETH
BY Paul, Paul & Moore
ATTORNEYS FIG. 27-B
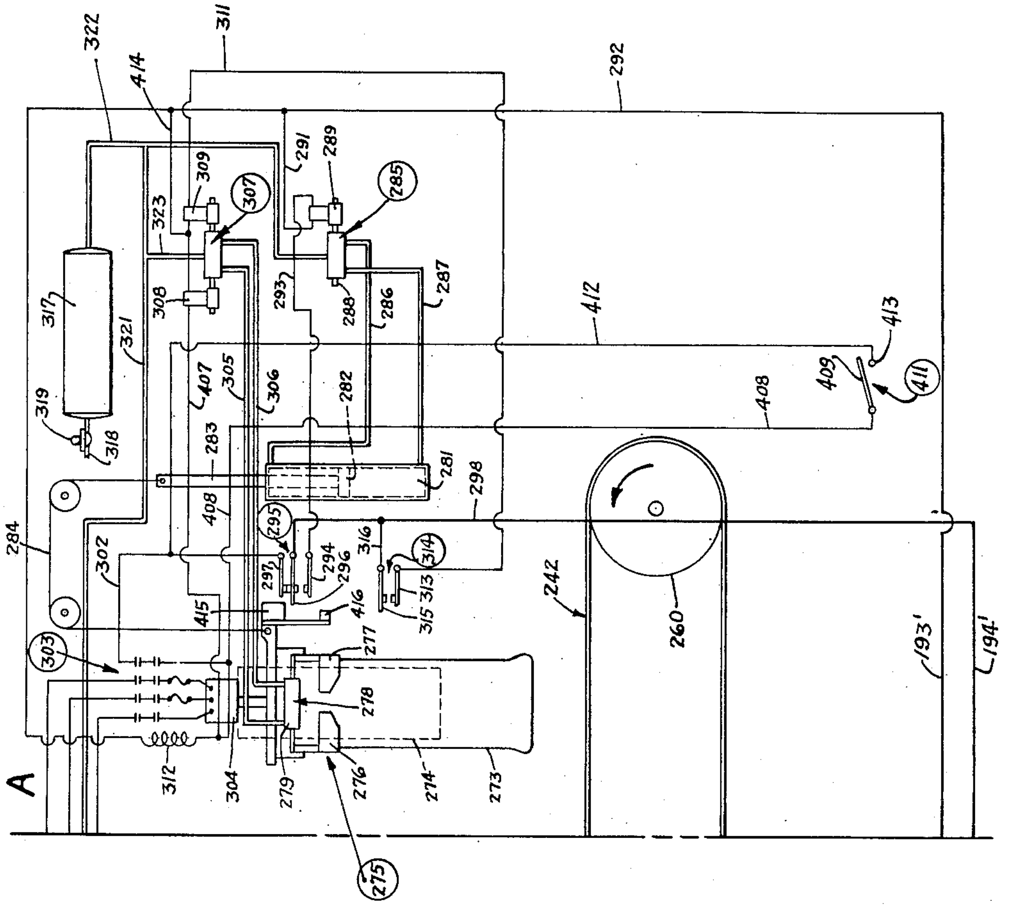
INVENTOR.
HAROLD V. KINDSETH
BY Paul, Paul & Moore
ATTORNEYS 2,763,458
Patented Sept. 18, 1956

2,763,458

MECHANISM FOR FILLING AND CLOSING FLEXIBLE CONTAINERS

Harold V. Kindseth, Minneapolis, Minn., assignor to Bemis Bro. Bag Company, Minneapolis, Minn., a corporation of Missouri Application September 5, 1950, Serial No. 183,229

11 Claims. (Cl. 249—58)

This invention relates to new and useful improvements in machines for filling and closing flexible walled bags or containers.

In the packaging of edible commodities such as flour, dried milk, and various other comminuted materials which are delivered to the trade in large multiwall or textile bags it is of utmost importance that the handling of the material during the packaging operation be accomplished in a highly efficient and sanitary manner. Heretofore, packaging of such materials has been accomplished with two or more machines, a packer for introducing an underweight charge into each bag after which each bag may be subjected to a vibratory or shaking action to settle the contents therein, or the bags may be successively delivered directly to an apparatus for closing the open bag tops. Such equipment has necessitated the services of two or more attendants, one attending the usual packer, another or others attending the other equipment required to complete each cycle of operation.

One of the important objects of the invention therefore is to provide an improved machine for packaging comminuted and pulverized materials such as flour, dried milk, and others, into large paper or textile bags, which machine embodies in one unit all of the necessary mechanisms for efficiently and expeditiously filling, check weighing, and sealing the bag tops, regardless of whether the material is to be introduced into paper bags or textile bags.

A further object of the invention is to provide a material packaging machine which is highly efficient and practical in operation, and on which the various mechanisms of the machine are so arranged that a single operator may readily manipulate the apparatus with a resultant reduction in the operation of packaging the material.

A further object is to provide a machine of the class described, wherein the filling and subsequently closing of the empty bags, regardless of whether of paper or textile material, may be expeditiously accomplished without requiring the attendant to manually lift the bags when transferring them from one station to another, one whereby the attendant is not likely to become fatigued or exhausted, as is possible when attending machines which may require frequent lifting of heavy bags from one station to another in the operation of filling and sealing the bags.

A further and more specific object of the invention is to provide in combination with a conventional packing machine, an open bag transporting conveyor composed of a plurality of V-belts disposed in spaced parallel relation and having their upper runs or strands cooperating to provide the load-carrying surface of the belt.

A further object is to provide a machine of the class described comprising a conveyor for transporting the bags from one station to the next, said conveyor being constructed of a plurality of V-belts disposed in closely spaced relation lengthwise of the conveyor, and the upper or load-carrying runs of the belts constituting the outer marginal edges of the conveyor being disposed at a higher elevation than the inwardly disposed belt runs, whereby the contour of the load carrying surface of the belt, cross-sectionally, is more or less V-shaped, thereby to substantially fit the bottoms of the filled bag bodies, and whereby the bags are not likely to relatively rotate on the conveyor, when transported from one station to the next.

A further object is to provide a machine of the class described, comprising a conveyor composed of a plurality of V-shaped belts disposed in spaced parallel relation to provide an overload carrying belt surface, or vertically movable bag supporting cradle or member normally being positioned beneath the surface of said conveyor and having means for automatically moving it into position to engage and support the bottom of each bag as it is being suspended from the packer tube, whereby the walls of the bag body are not subjected to severe strains which might in some instances damage the bag walls, said cradle also serving to accurately guide each bag onto the conveyor so that the seam usually provided at the bottom of each bag will be accurately aligned with the conveyor, whereby the bags, when successively placed upon the conveyor from the packer tube, will maintain their proper positions thereon with respect to the weighing and bag top closing units through which each bag passes from the packer tube.

Other objects of the invention reside in the unique construction and operation of the bag bottom engaging cradle or member which automatically moves into bag supporting engagement with each bag bottom with a positive and accurately timed action, thereby to support the bag body during the filling operation, and whereby the bag is guided into proper position upon the receiving conveyor; in the provision of the check weigher provided over the conveyor for introducing additional material into each underweight bag to bring it up to full weight before the bag is passed on to the bag top closing station; in the novel construction and arrangement of the bag top closing means which preferably comprise two independent units, one embodying a sewing machine for sewing the tops of textile bags, and the other being adapted for closing and sealing the open tops of multiwall paper bags by the application to the upper edges of the flattened bag top walls of a suitable sealing strip; and in the provision of such a machine wherein the various operating units are arranged in a very compact manner so that the machine, as a whole, requires a minimum of floor space; and the various mechanisms of the machine presenting the utmost in simplicity of construction and operation, whereby each machine may readily be operated by an unskilled operator.

These and other objects of the invention and the means for their attainment will be more apparent from the following description taken in connection with the accompanying drawings.

In the accompanying drawings there has been disclosed a structure designed to carry out the various objects of the invention, but it is to be understood that the invention is not confined to the exact features shown, as various changes may be made within the scope of the claims which follow.

Figures 27A and B are a wiring diagram illustrating the various electrical and pneumatic controls and the connection therebetween; and Figure 28 is a detail sectional view to illustrate the interior construction of the air control valves.

GENERAL

Figure 1:
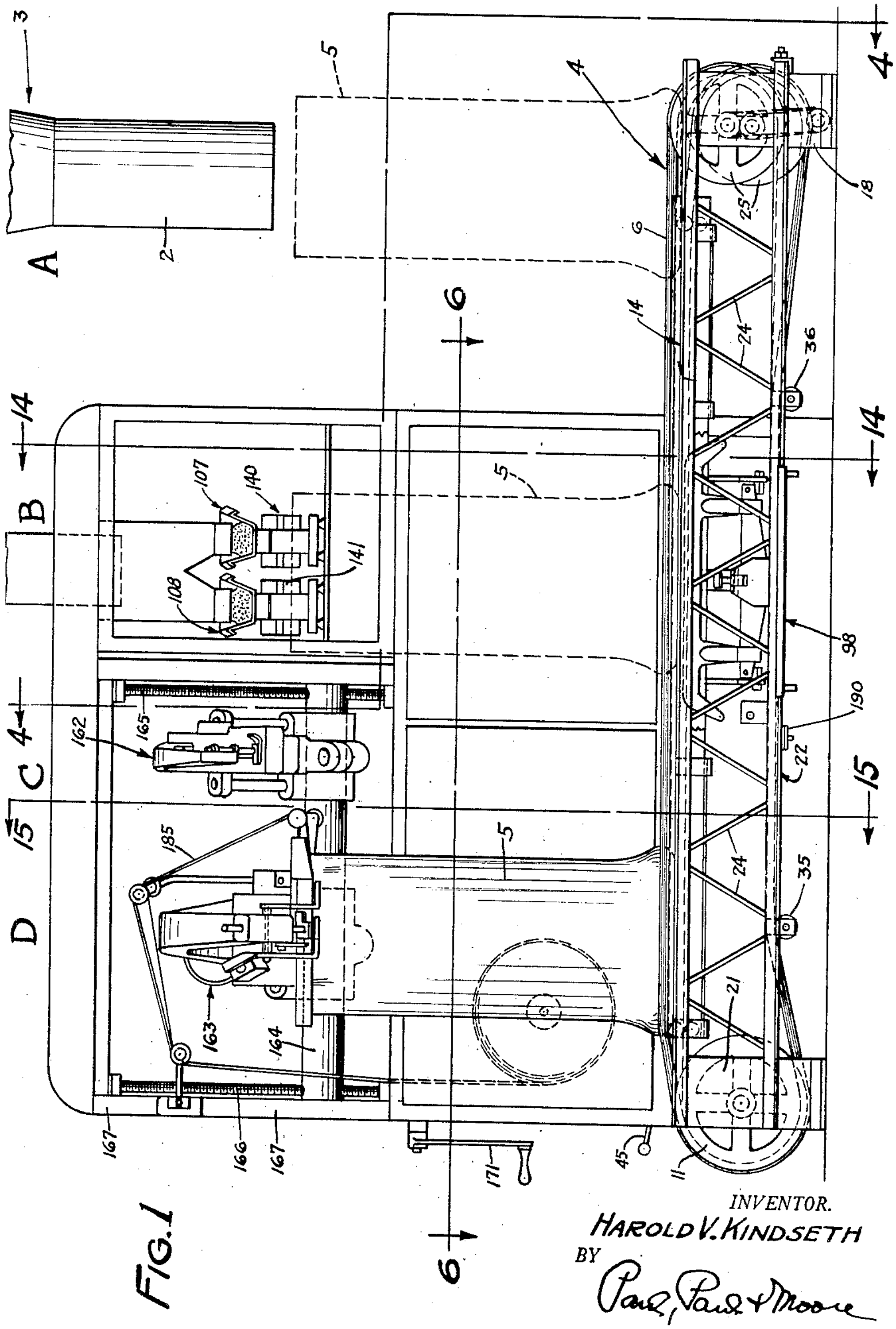
Figure 1 is a front view of the machine showing the conveyor for transporting partially filled bags from the packer tube to the dribbler and also indicating the means for closing the bag top.
Figure 4:
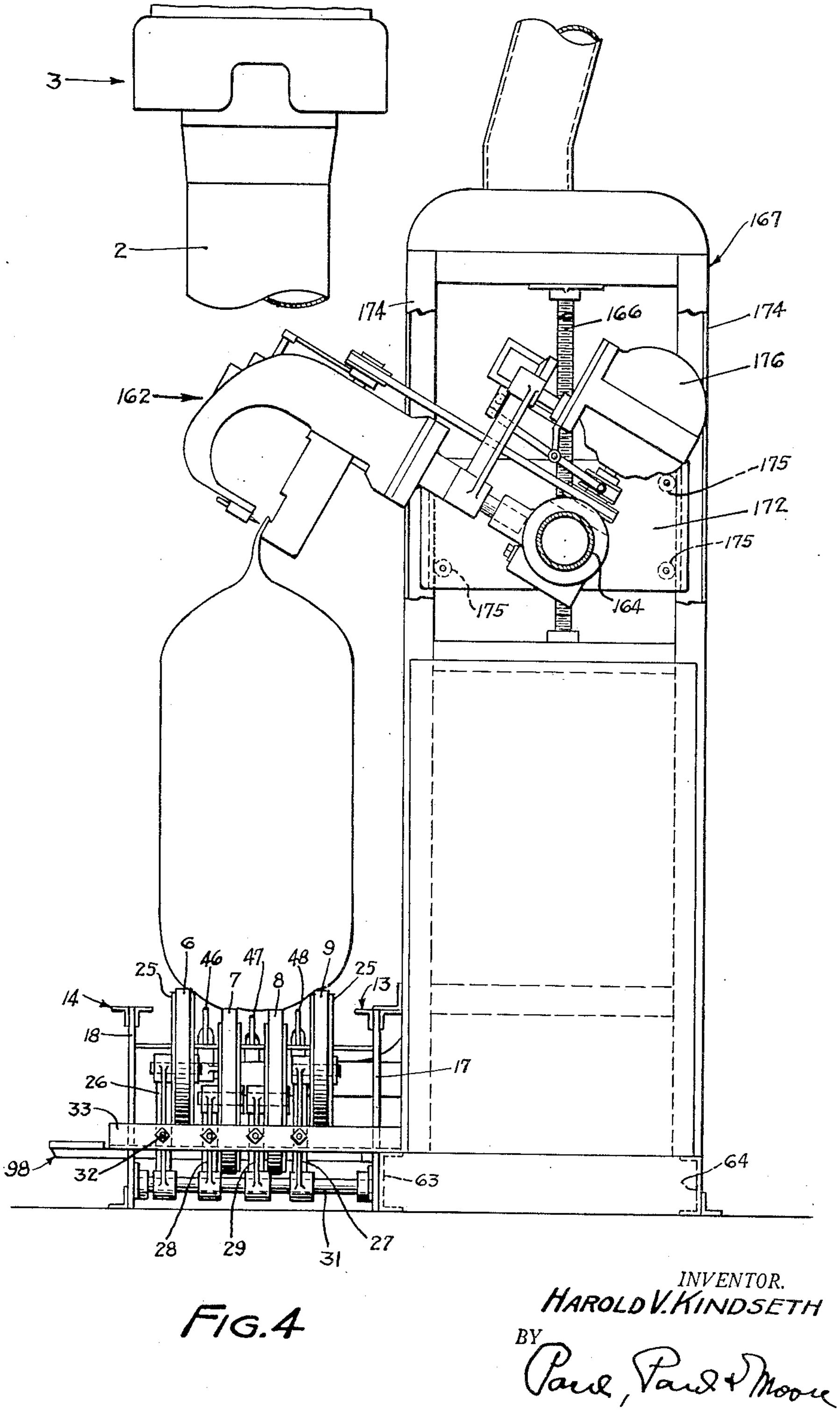
Figure 4 is an end elevation partly broken away on the line 4—4 of Figure 1 showing the V-shaped contour of the conveyor, and also showing a bag top engaged with a sewing machine.

In the accompanying drawings, there is illustrated in Figures 1 and 4, for purposes of disclosure, the packer tube 2 of a conventional flour packer, generally designated by the numeral 3. The flour packer 3 constitutes no part of the present invention, and it is therefore deemed unnecessary herein to illustrate the packer in detail.

*Conveyor for transporting the filled bags*

A suitable conveyor, generally designated by the numeral 4, has one end disposed beneath the packer tube 2 and is adapted to successively receive bags 5 from the packer tube, after each bag has received a charge of material which, as is well known in the art, is usually slightly underweight.

Figure 5:
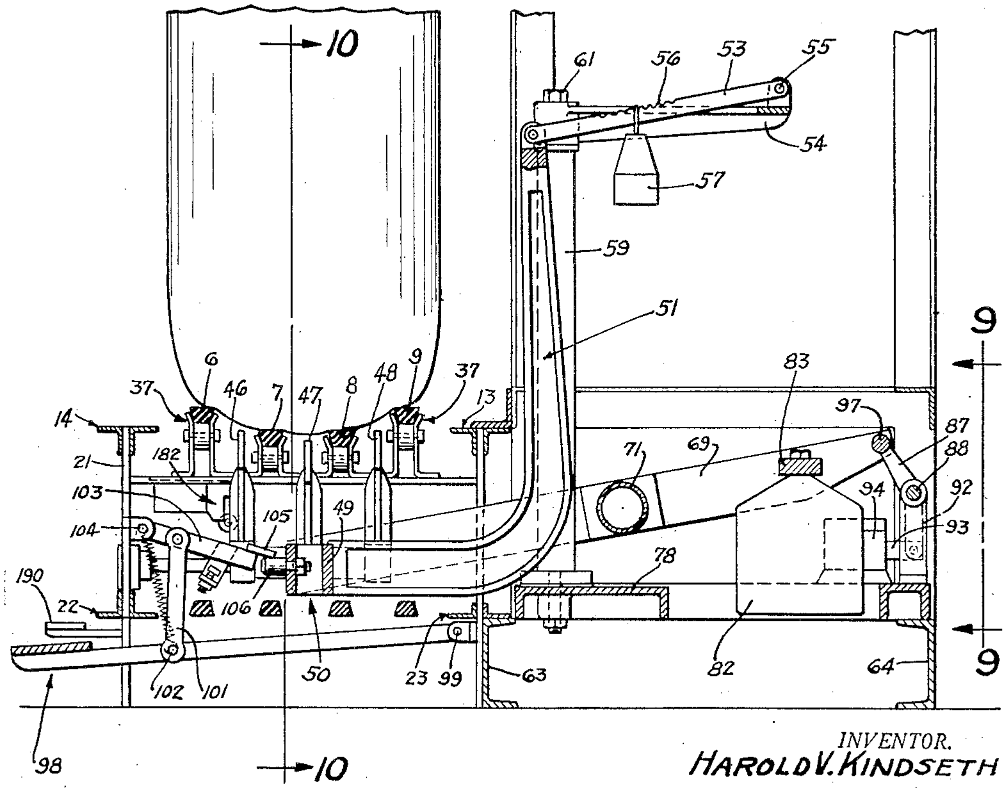
Figure 5 is a vertical detail sectional view on the line 5—5 of Figures 6 and 10 showing the scale platform in lowered position.
Figure 14:
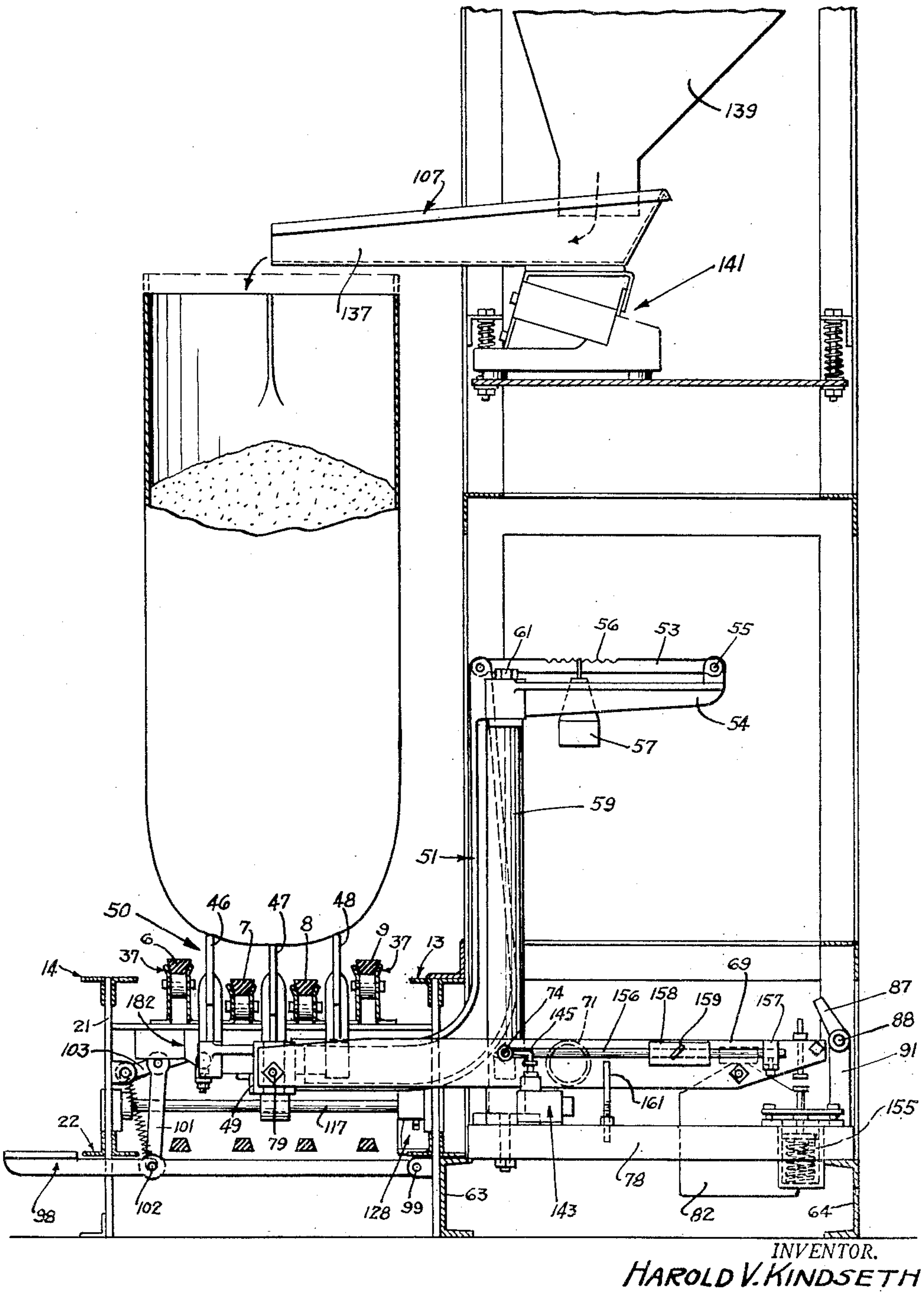
Figure 14 is a vertical sectional view substantially on the line 14—14 of Figures 1 and 6 showing a completely filled bag in balanced position upon the scale and also indicating the foot pedal for lowering the bag into engagement with the conveyor.
Figure 15:
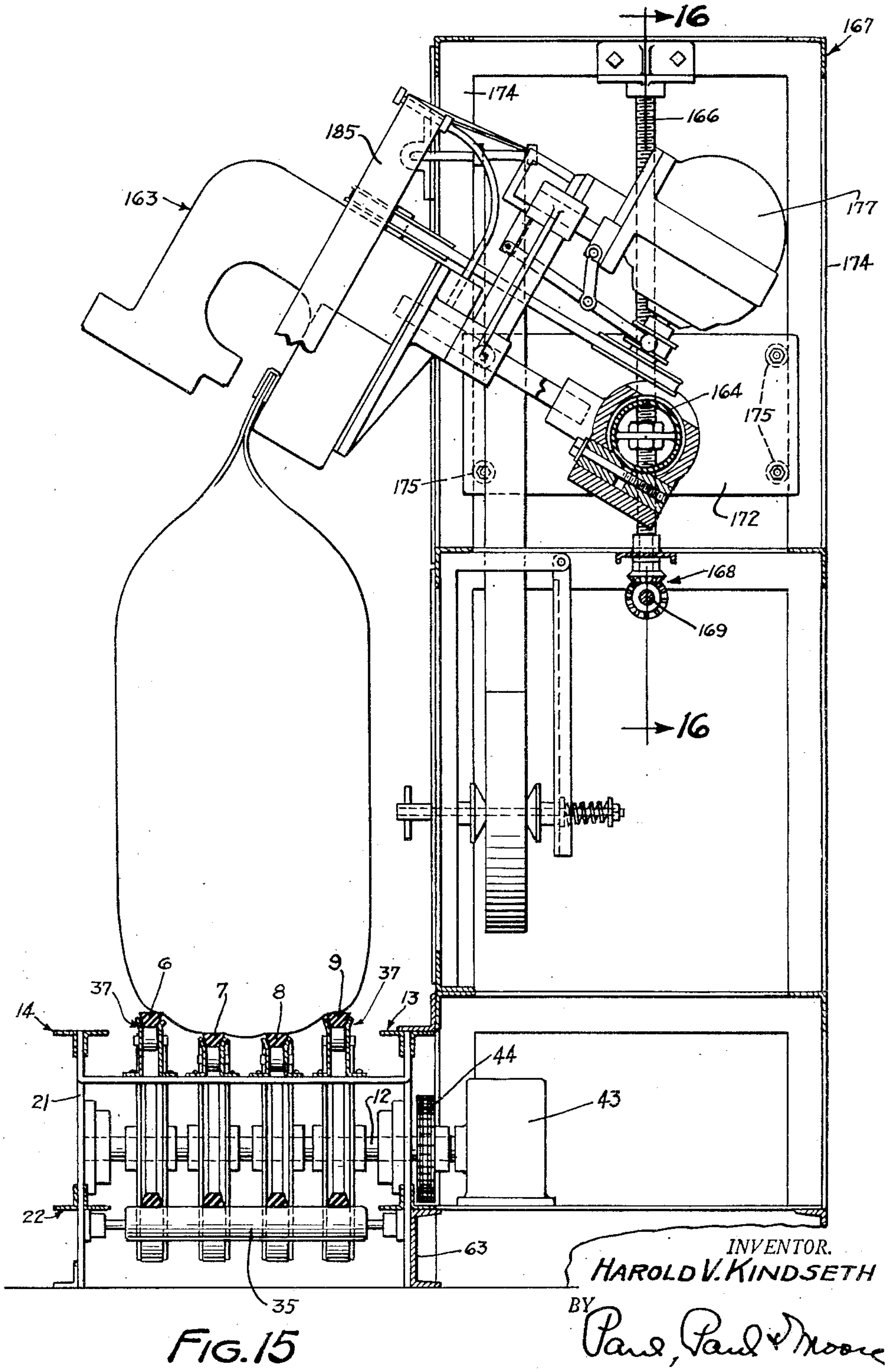
Figure 15 is a vertical sectional view on the line 15—15 of Figure 1 showing the position of the bag top when the sealing strip is applied thereto.

The conveyor 4, it will be noted by reference to Figures 4, 5, 14 and 15, is composed of a plurality of V-belts 6, 7, 8 and 9, disposed in spaced parallel relation with the upper runs of the intermediate belts 7 and 8, disposed at an elevation below the upper runs of the belts 6 and 9, whereby the four belt runs cooperate to provide, in effect, a conveyor whose bag carrying surface is substantially V-shaped in cross section, as indicated in Figures 4, 5, and 15. The conveyor belts are supported at the discharge end of the conveyor by a plurality of sprockets 11, secured to a shaft 12 mounted in suitable bearings provided in the supporting frame of the conveyor.

The conveyor supporting frame is shown comprising upper side rails 13 and 14 each composed of a pair of angle irons 15 and 16, arranged back to back, and having the upper ends of upright plate elements 17 and 18 secured therebetween at the receiving end of the conveyor, and similar plate elements 19 and 21 at the discharge end of the conveyor. Auxiliary side rails 22 and 23, similar to the upper side rails 13 and 14, are secured to the upright plate elements 17, 18, 19 and 21 by suitable means such as welding. Diagonal braces 24 are shown having their upper ends interposed between the angle irons 15 and 16 of the upper side rails 13 and 14, and the lower ends of said braces are similarly disposed between and secured to the angle irons of the lower side rails 22 and 23, thereby to provide a very substantial supporting structure.

The V-belts 6 to 9, inclusive, are supported on idler pulleys 25 at the receiving end of the conveyor. The pulleys for the outer belts 6 and 9 of the conveyor are shown supported on arms 26 and 27, and the intermediate belts 7 and 8 are shown supported on relatively shorter arms 28 and 29. The arms are supported on a cross shaft 31, and are adapted for independent pivotal movement thereon by suitable adjusting rods or bolts 32. Each such bolt has one end secured to its respective pulley supporting arm, and its opposite end being supported in the cross member 33. Adjusting nuts 34 are received in threaded engagement with the end of a rod 32, whereby the arms may conveniently be manipulated to maintain the belts under proper tension.

Transversely disposed rollers 35 and 36 are mounted on the lower side frame members 22 and 23 of the conveyor supporting frame to support the lower runs of the conveyor belts. The upper load carrying runs of the V-belts are shown supported in channel-like guides, generally designated by the numeral 37, having anti-friction rollers constituting the bottoms thereof to minimize friction between the load-carrying runs of the V-belts and the supporting frame.

Conveyor drive means

Figures 2, 3:
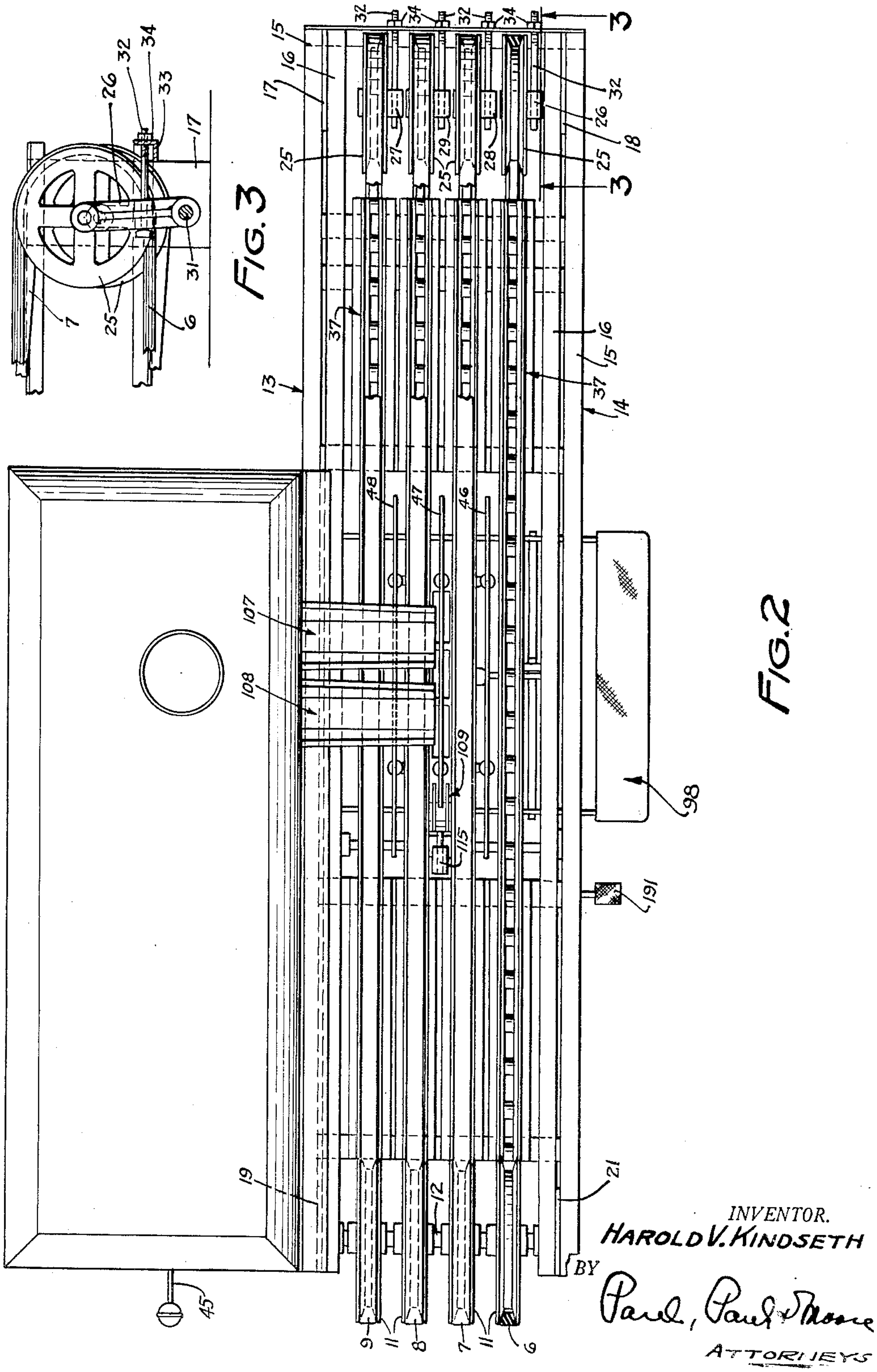
Figure 2 is a plan view of Figure 1 with the packer tube omitted.
Figure 3 is a detail vertical sectional view on the line 3—3 of Figure 2 showing the means for tensioning the V-belts.
Figure 6:
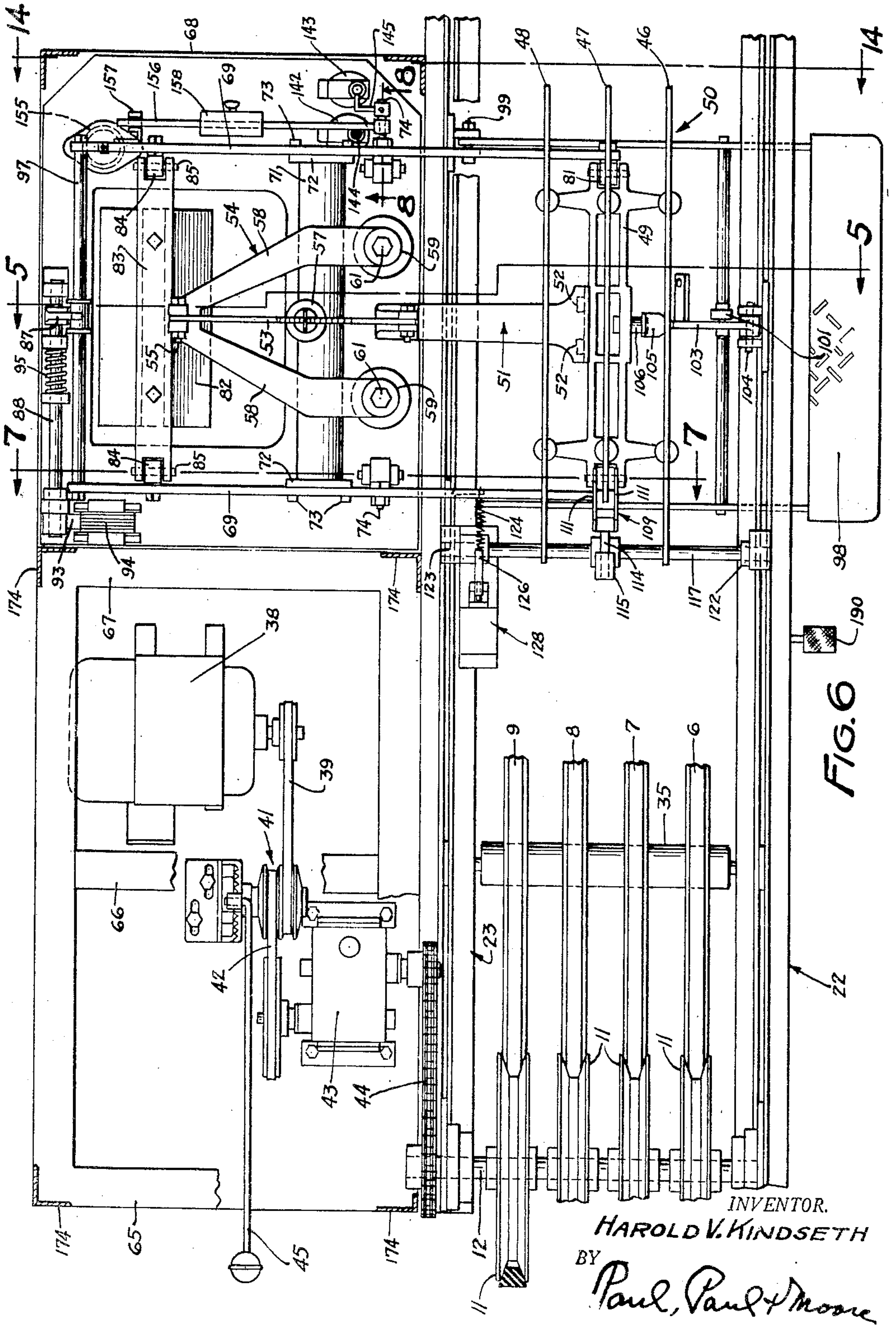
Figure 6 is a horizontal sectional plan view substantially on the line 6—6 of Figure 1 showing the drive for the conveyor and also the weighing mechanism.

The means for driving the conveyor is best illustrated in Figure 6, and comprises a motor 38 having a belt drive 39 connecting it to a conventional clutch-type pulley 41. Pulley 41 comprising in effect dual pulleys for receiving the belt 39 and a similar belt 42 which operatively connects the drive pulley 41 to the high speed shaft of a conventional speed reducer, generally designated by the numeral 43. The low speed shaft of the speed reducer is shown having a chain drive 44 connecting it to the driven shaft 12 of a conveyor. The clutch 41 is operable to vary the speed of the conveyor by manipulation of a suitable control lever 45, shown in Figures 2 and 6.

Weighing platform

In the operation of a material packaging machine of the general character herein disclosed, it is customary to so adjust or set the packer that it will deliver a short weight charge or load into each bag. The underweight bag is then delivered onto a weighing platform where additional material is delivered into each bag to bring the bag up to full measure or weight.

The weighing platform herein disclosed, generally designated by the numeral 50, is of the weight-operated type, and comprises a plurality of spaced parallel bars 46, 47 and 48, secured to a supporting frame 49. An L-shaped arm 51 has the forward end of its lower horizontal portion fixedly secured to the frame 49 of the weighing platform 50, by suitable means such as bolts 52. The upper end of said arm is pivotedly connected to one end of an auxiliary scale beam 53, having its opposite end pivoted to a fixed support 54 by a pin 55. The upper edge of the auxiliary scale beam 53 is preferably serrated, as indicated at 56, to retain a suitable balanced auxiliary weight 57 in adjusted position thereon. The scale beam 53 may be provided with suitable indicia, as is customary in devices of this character.

The auxiliary scale beam 53 and weight 57 provide means for accurately balancing the weighing platform 50, should said platform be slightly out of balance because of inaccuracies in the construction and assemblage of the various parts of the apparatus.

To provide the necessary rigidity and ruggedness for the support 54 to reduce vibration to a minimum, the support 54, as best shown in Figure 6, comprises inclined arms 58 having their outwardly spaced terminals secured to the upper ends of a pair of upright posts 59 by suitable bolts 61. The lower ends of the posts 59 are shown secured to a fixed portion 78 of the main frame of the machine. The machine frame is shown comprising longitudinally extending side frame members 63 and 64, preferably of channel cross section secured together by transverse frame members 65, 66, 67 and 68, as indicated in Figure 6.

The main supporting means for the scale platform 50 is shown comprising a pair of spaced apart scale beams 69 secured together in spaced relation by a tubular member 71 provided with flanged ends 72 to which the scale beams 69 are secured by suitable means such as bolts 73.

The scale beams 69 are mounted for pivotal movement, as will be understood by references to Figures 5 and 14. To thus support the scale beam 69, studs 74 as shown in Figure 14, preferably square in cross section, but not necessarily so, are secured to the intermediate portions of the scale beams 69, and are so disposed thereon that opposed corners of each stud are located in a plane disposed at right angles to the length of the scale beams. By so arranging the studs 74, the lower corner of each stud serves as a knife edge about which the composite scale beam may freely pivot. V-shaped blocks 75 are shown pivotally supported in upright brackets 76 by pivots 77, and provide self-aligning supports for the pivot studs 74 of the scale beams.

Figures 7, 8, 9:
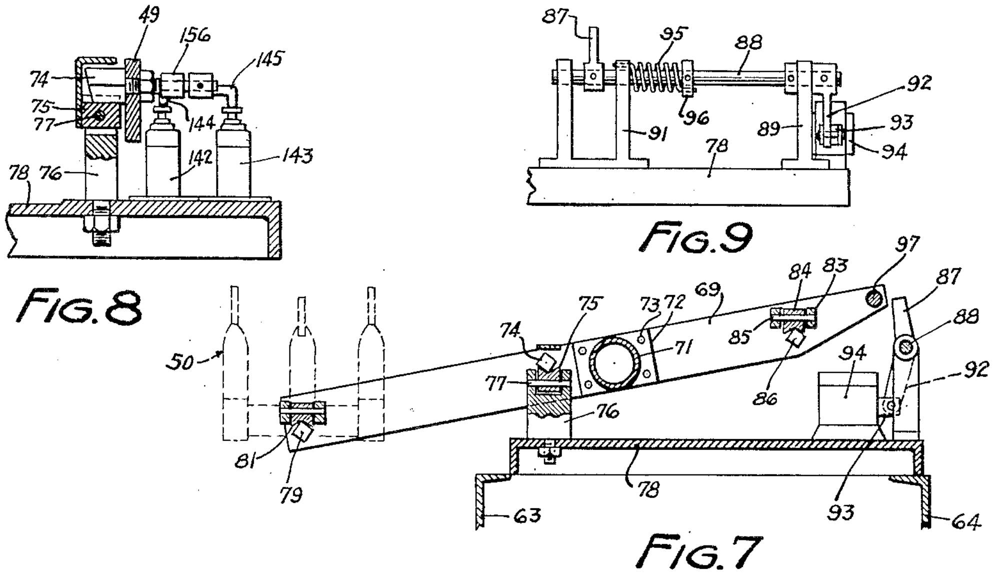
Figure 7 is a horizontal detail sectional view on the line 7—7 of Figure 6.
Figure 8 is a detail sectional view on the line 8—8 of Figure 6 showing the means for controlling the operation of the primary and secondary dribblers.
Figure 9 is a fragmentary detail view taken in the direction of the arrows 9—9 of Figure 5 showing the means for locking the weighing platform in depressed or lowered position.

Similar knife edge studs 79 are secured to the forward ends of the scale beams 69 for pivotally supporting the weighing platform 50 thereon, as indicated in full and dotted lines in Figure 7. V-shaped blocks 81, similar to the blocks 75, are pivotally mounted on the scale platform and cooperate with the studs 79 to provide knife edge supports.

To counterbalance the weight of the weighing platform 50 and the underweight bag supported thereon, a counterweight 82 is shown suspended from a supporting bar 83 having its opposed ends forked to receive V-blocks 84 similar to the blocks 75 and 81. The blocks 84 are pivotally secured in the forked ends of the supporting bar 83 by pivot pins 85. Knife edged studs 86 are secured in the rear end portions of the scale beams 69 adapted to be engaged by the pivot blocks 84, thereby to pivotally support the supporting bar 83 on the rear end portion of the scale beams 69, and whereby the weight of the counterweight 82 is transmitted to the scale beams 69 and constantly tends to urge the scale platform upwardly to the position shown in Figure 14.

Means is provided for locking the weighing platform 50 in bag supporting position, and is shown comprising a latch 87 secured to a rockshaft 88 mounted in brackets 89 and 91, secured to the frame portion 78 of the machine frame, as best shown in Figure 9. The bracket 91 is shown comprising dual uprights to provide greater support for the latch 87. A depending arm 92 is also secured to the rockshaft 88 and has its lower end pivotally connected to the armature 93 of a solenoid 94, as illustrated in Figures 5 and 7. A spring 95 has one end fixed to the bracket 91 and its opposite end to a collar 96 secured to the rockshaft 88, whereby the spring constantly urges the latch 87 in a direction to engage a cross rod 97 secured to the rear ends of the scale beams 69, as clearly illustrated in Figures 5 and 7. The spring 95 causes the latch 87 to automatically secure the scale platform in depressed position as shown in Figure 5, when the solenoid is de-energized and the operator manually depresses the scale platform, as will next be described.

Control means

The control means includes a foot pedal 98 which is manually operable to transfer the completely filled bag onto the conveyor from the weighing platform, when it has received its full charge and is to be transferred to the bag top closing means, subsequently to be described.

The means provided for thus manually depressing the scale platform is shown comprising a foot pedal 98 pivoted at one end to the main frame of the machine by a pivot pin 99, as shown in Figure 5. One end of a link 101 is pivoted to the foot pedal 98 by a pivot 102, and the opposite end of said link is pivoted to an intermediate portion of an arm 103 pivoted at 104 to the conveyor frame. The opposite swingable end of the arm 103 has an element 105 secured thereto adapted to engage a stud 106 fixed to the frame 49 of the weighing platform 50, whereby when the foot pedal is manually depressed, the weighing platform is correspondingly depressed below the surfaces of the multiple strands of the conveyor, as shown in Figure 5.

Figure 19:
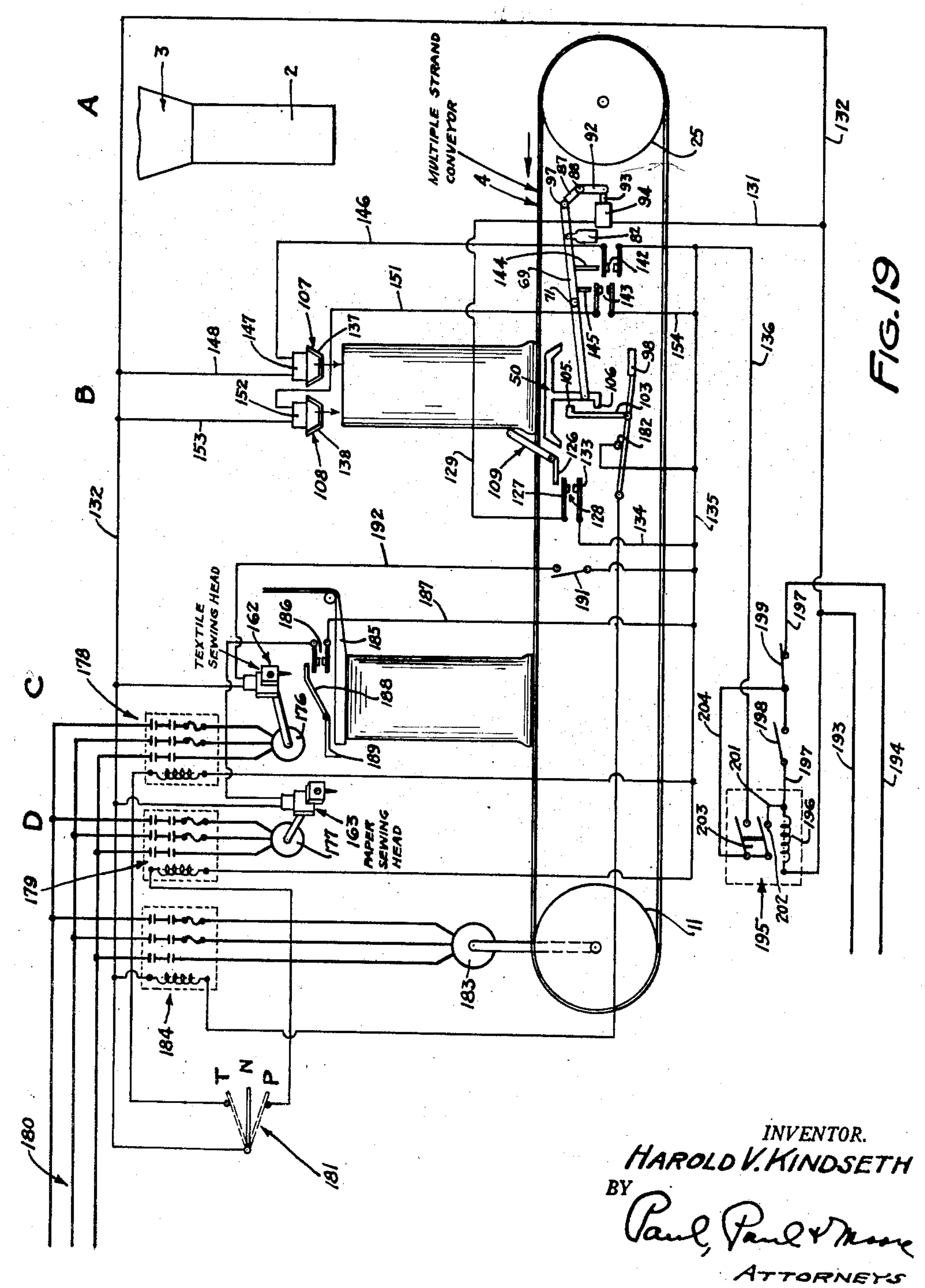
Figure 19 is a schematic wiring diagram showing the electrical connections between the various control elements.

Means is provided for automatically actuating the scale to elevate each underweight bag to a position above the conveyor, when each bag passes from station A to station B, whereby the bags successively come to rest beneath a pair of small vibratory troughs 107 and 108, indicated in Figures 14 and 19.

Figures 10, 11:
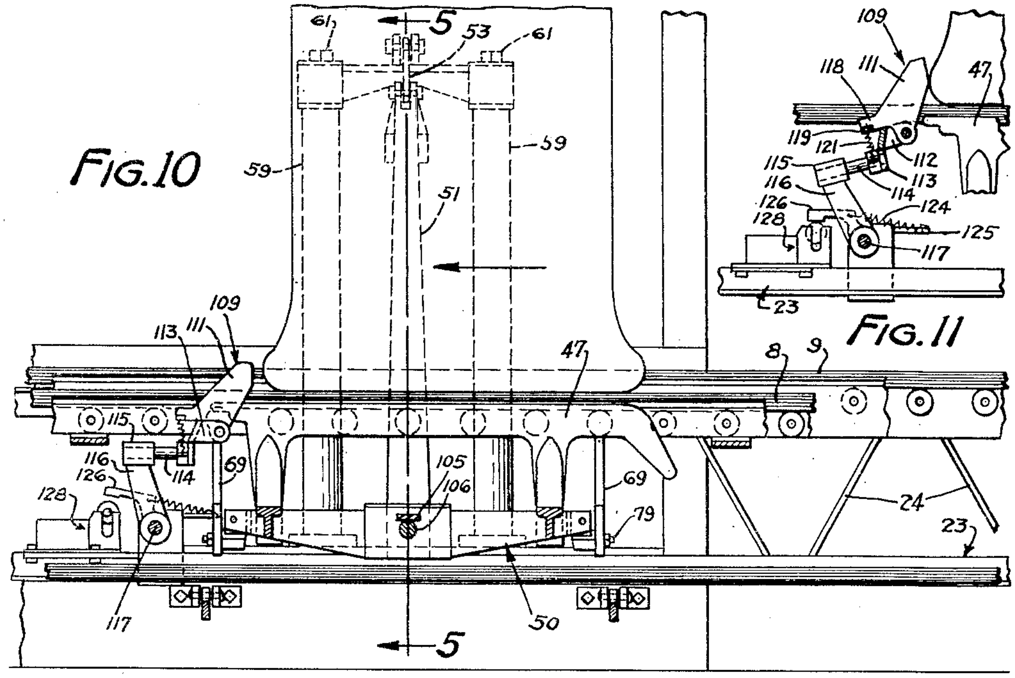
Figure 10 is a vertical detail sectional view on the line 10—10 of Figure 5 showing a partially filled bag supported on the conveyor and having its lower front corner about to engage the trip switch for effecting the operation of the relays of the scale platform supporting arm, whereby the scale platform is elevated to a bag supporting position above the conveyor.
Figure 11 is a fragmentary detail view showing the leading corner of the bag bottom engaged with the switch arm for effecting the release of the weighing platform.

To thus cause the scale platform to automatically elevate the bag to a position above the conveyor at station B, a trip switch, generally designated by the numeral 109, is positioned in the path of the advancing bags, as shown in Figure 10, it being understood the weighing platform is in its depressed position beneath the surface of the conveyor, as the bag advances from station A to station B. When the lower leading corner of bag body engages switch 109, it effects the automatic release of the scale platform, whereby the counterweight 82 overbalances the weight of the underweight bag, and thus drops to the position shown in Figure 14, whereby the underweight bag is moved out of contact with the conveyor and temporarily is supported directly upon the scale platform 50 directly beneath the vibratory troughs 107 and 108, as shown in Figure 14.

The trip switch 109 comprises a pair of spaced blade-like elements 111 pivotally supported in slots 112 provided in a bracket 113, shown secured to one end of a short rod 114, the opposite end of which is secured to the upper end of hub 115 of an arm 116 secured to a cross shaft 117. The switch elements 111 of the trip switch 109 have laterally disposed end portions 118 secured together by a cross piece 119 whereby the switch elements 111 operate as a unit. A spring 121 has one end secured to the tie member 119 of the switch 109 and its opposite end to the bracket 113, whereby the spring 121 constantly urges the switch elements 111 into their normal positions, shown in Figure 11. The spaced plate elements 111 of the trip switch 109 permits said switch 109 to be centrally located in the conveyor as said plate elements are disposed at opposite sides of the center bar 47 of the scale platform.

Figure 12:
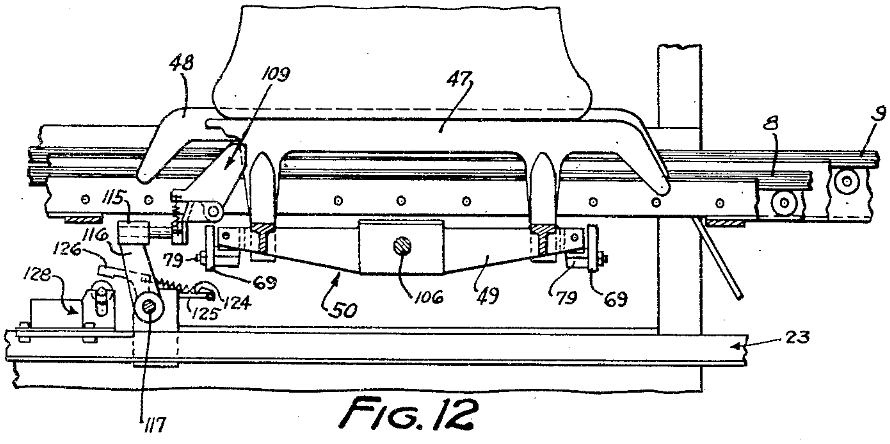
Figure 12 is a vertical detail sectional view similar to Figure 10, but showing the scale platform elevated to lift the partially filled bag out of engagement with the conveyor.
Figure 13:
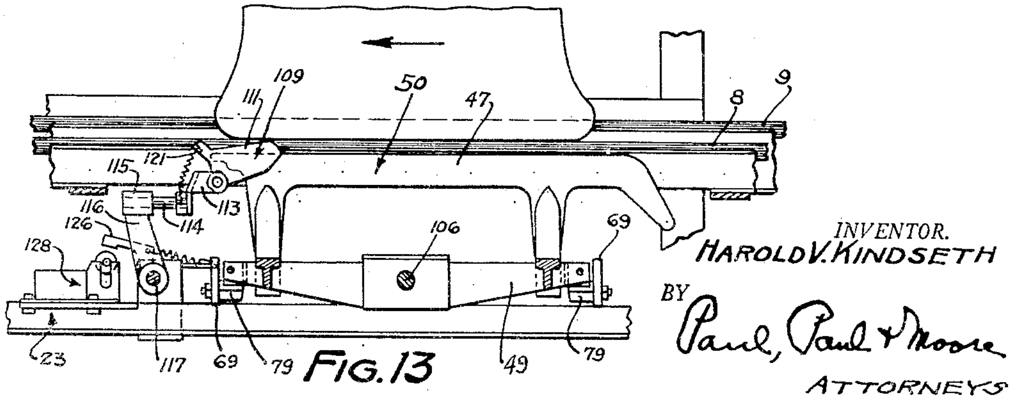
Figure 13 is a view similar to Figure 12, but showing the bag lowered onto the conveyor after having received the necessary material from the dribblers to bring the bag up to full weight.

The cross shaft 117 is shown supported in suitable bearings 122 and 123, provided in the machine frame. The trip switch 109 is normally retained in the position shown in Figures 10 and 12 by a spring 124 having one end secured to a fixed stud 125 and its opposite end to a switch actuating member 126, secured to the rockshaft 117. The switch actuating member 126 is adapted to engage the movable contact 127 of a normally open switch 128. The movable contact 127 of switch 128 has a wire 129 connecting it to one end of the coil of the solenoid 94, and the other end of the solenoid coil has a wire 131 electrically connecting it to a conductor 132, as shown in the wiring diagram. The fixed contact 133 of switch 128 has a wire 134 connecting it to a conductor 135, one end of which is shown electrically connected to a wire 136.

*Check weigher*

The check weigher comprises the vibrating troughs 107 and 108 and serves to introduce the additional material into each underweight bag to bring the weight of its contents up to full measure before the filled bag is passed on to the bag top closing mechanism, indicated at stations C and D. The check weigher is of conventional construction and it is therefore believed unnecessary herein to describe the same in detail.

Briefly, it comprises the troughs 107 and 108 which, for illustrative purposes, are shown connected to a hopper 139 from which they receive the material to be delivered into each underweight bag. As is well known, the troughs 107 and 108 are actuated by suitable vibrating mechanisms, generally designated by the numerals 140 and 141, which impart a vibratory action to each trough to cause the material to trickle slowly therefrom into the open mouth of the bag positioned on the scale platform therebeneath, as indicated by the arrows in Figures 14 and 19.

The trough 107 will hereinafter be referred to as the bulk feeder, and the trough 108 as the dribbler, as they are commonly referred to in the trade. The bulk feeder 107 delivers a relatively larger flow of material into the open bag top than the dribbler 108, whereby the major portion of the shortage of each underweight bag is quickly introduced into the bag, after which the bulk feeder automatically cuts off. The dribbler, however, continues to deliver a small stream of material into the bag until the weight of its contents is brought up to full measure, whereupon the dribbler comes to rest.

The operations of the bulk feeder 107 and dribbler 108 are electrically controlled by switches 142 and 143, respectively, shown in Figures 8, 14, and 19. The movable contacts of said switches are adapted to be actuated by movable elements 144 and 145, schematically illustrated in Figure 19, whereby when the scale beams 69 are in the position shown in Figures 5 and 19, the switches 142 and 143 are open, to interrupt the flow of current to the bulk feeder 107 and dribbler 108, as best illustrated in Figure 19. When the scale beams are released from the latch 87 as a result of an underweight bag advancing from station A to station B and effecting energization of the solenoid 94, the counterweight 82 drops by gravity to the position shown in Figure 14, whereby the switch actuating elements 144 and 145 engage their respective switches 142 and 143 and complete the circuits therethrough whereby the bulk feeder 107 and vibrator 108 are automatically set into motion to deliver material into the bag.

Switch 142, it will be noted by reference to Figure 19, has its movable contact connected by wire 146 to the vibrator 147 of bulk feeder 107, and a second wire 148 connects vibrator 147 to a conductor 132 of a supply circuit, as will readily be understood by reference to Figure 19. The other side of switch 142 is connected to wire 136. The movable contact of switch 143 of the dribbler 108 has a wire 151 connecting it to a vibrator 152, similar to vibrator 147, and a wire 153 connects the other side of vibrator 152 to conductor 132. A wire 154 connects the fixed contact of switch 143 to wire 135.

Switch actuating elements 144 and 145 are so related to their respective movable switch contacts that the switch 142 of the bulk conveyor is closed in advance of the dribbler switch 143, when the scale beams 69 are released and descend to their lowered positions, whereby the bulk feeder starts to function in advance of the dribbler.

As the scale beam and bag gradually settle to a balanced condition upon the introduction of the necessary additional material into the underweight bag from the bulk feeder, the dribbler switch actuating element 144 effects the opening of switch 142 in advance of switch 143, whereby the bulk feeder will cut off, but the dribbler will continue to operate until the bag has received its full charge. When this occurs, the switch actuating element 145 will open switch 143 and thereby interrupt operation of the dribbler. A dashpot 155 of more or less conventional design, is arranged to be engaged by the scale beams when released from the latch, thereby to cushion their descent. It is to be understood that when the scale beams are thus released, the scale platform 50 is empty.

Means is also provided for causing the scale beams and weight 82 to more readily start their upward movement, as additional material is delivered into the bag supported on the scale platform by the bulk feeder and dribbler. Such means is shown comprising a rod 156 shown having one end pivoted to one of the knife edge studs 74 of the scale beams. This stud, it will be noted by reference to Figures 6 and 8, is extended outwardly beyond the adjacent scale beam 69 to provide a pivotal support for the adjacent end of the rod 156. A keeper 157 is secured to the outer end of the adjacent scale beam 69 for supporting the opposite end of the rod 156 on the scale beam, when the scale beam assumes its balanced or an upper position, as shown in Figures 5 and 14.

A weight 158 is slidably supported on the rod 156 and has a lock screw 159 for securing it in adjusted position. A stud 161 is shown secured to the frame of the machine and extends upward to provide a support for the rod 156 and weight 158, when the scale beams are in their lowered positions. In other words, when the scale beams descend to their lowered positions the rod 156 will engage the top of the stud 161 whereby the free end of the rod is moved out of keeper 157, and substantially the entire weight of the rod 156 and weight 158 is then transferred onto the fixed stud 161. When the rear end of the scale beams ascends to a balanced position, as shown in Figure 14, the keeper 157 will pick up and support the free end of the rod, whereby the combined weight of said rod and its sliding weight 158 become, in effect, a portion of the main counterweight for balancing the scale platform.

To facilitate construction of the switch actuating elements 144 and 145 diagrammatically illustrated in Figure 19, element 144 may be supported on the rod 156 adjacent to its pivoted end, and element 145 may be supported on the extension of stud 74, as best indicated in the upper right hand corner of Figure 6.

*Bag top closing means*

The bag top closing means is shown comprising two independent sewing units 162 and 163, shown adjustedly mounted upon a tubular supporting member 164 supported on upright threaded rods 165 and 166 rotatably supported in the upper frame structure 167 of the machine frame. The lower ends of the rods 165 and 166 are provided with bevel gear drives 168 for operatively connecting them to an operating shaft 169, having a crank 171 whereby the upright posts 165 and 166 may be conveniently rotated to elevate the tubular supporting member 164 and the sewing heads mounted thereon.

Figures 16, 17, 18:
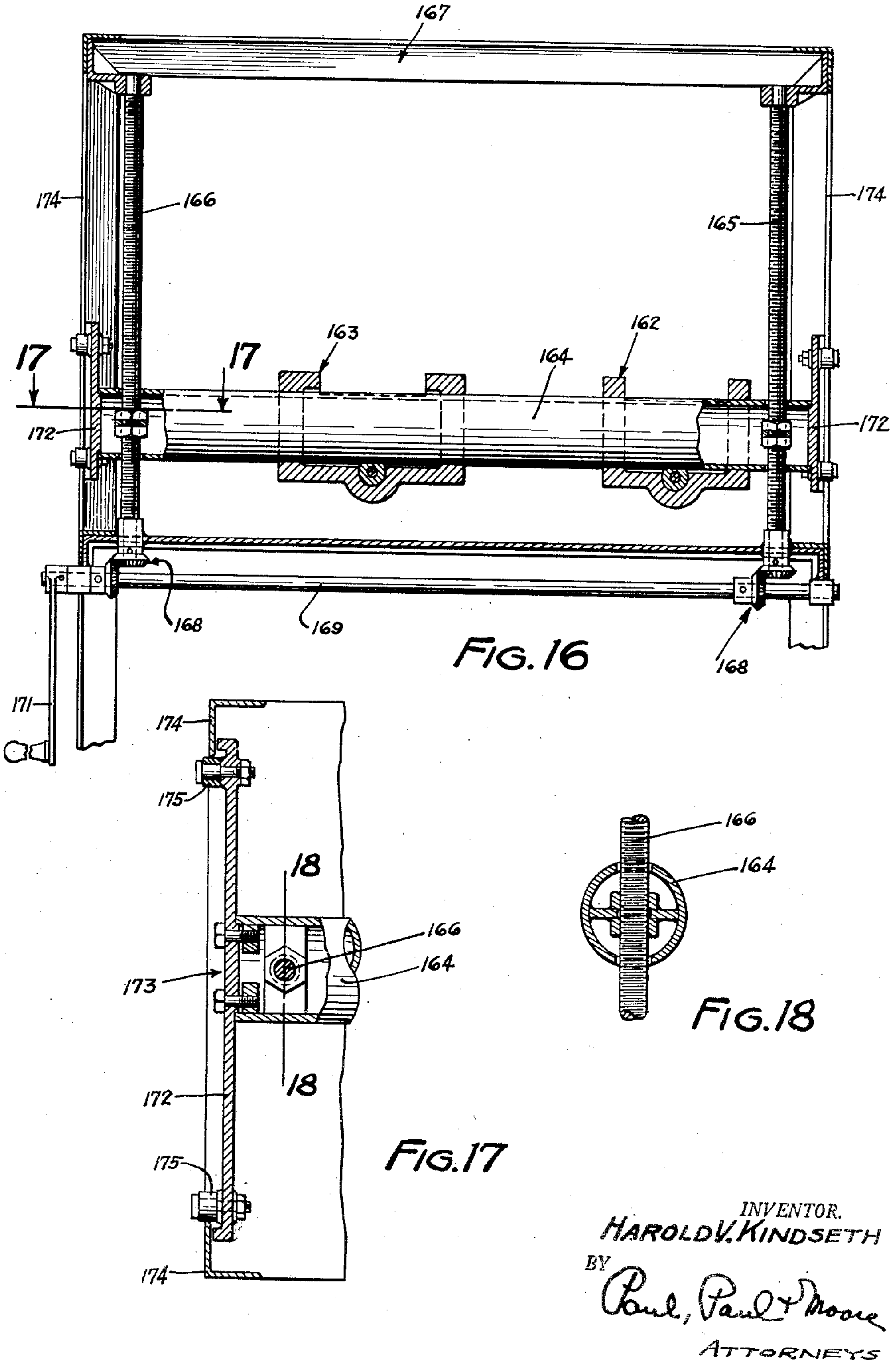
Figure 16 is a vertical detail sectional view on the line 16—16 of Figure 15 showing the means for vertically adjusting the sewing heads for closing the bag tops.
Figure 17 is a horizontal detail sectional view on the line 17—17 of Figure 16.
Figure 18 is a fragmentary vertical sectional view on the line 18—18 of Figure 17.

To guide the tubular member in its up and down movement, plate elements 172 and shown secured to the ends of the tubular member 164 as shown at 173 in Figure 17. These plates extend laterally from the ends of the tubular member to the upright angle iron posts 174 of the machine frame. Antifriction rollers 175 are secured to the ends of the supporting plates 172 and are arranged to travel on the edges of the angle iron corner posts 174, as clearly illustrated in Figures 16 and 17, whereby the two sewing heads may readily be raised or lowered by the manipulation of the crank 171 to adapt the machine for bags of different heights.

Two sewing heads are required, one for sewing the top of textile bags and the other for closing the tops of large multiwall paper bags. In the accompanying drawings sewing head 162 is shown located at station C and sewing head 163 at station D. These sewing heads are of conventional construction and therefore need not be described in detail. Each comprises an electrically operated needle driven from independent motors 176 and 177, schematically illustrated in Figure 19. Said motors have magnetic starters 178 and 179, respectively, shown connected to a conventional three-phase power supply circuit, generally designated by the numeral 180. A selector switch 181 is interposed in the control circuits of the magnetic starters 178 and 179 of the sewing head motors 176 and 177, whereby the operator may readily and conveniently selectively condition the sewing heads for use, depending upon whether textile or paper bags are being filled and closed.

*Operation*

To complete the operation of filling and closing bags as disclosed in Figures 1 to 19, inclusive, each underweight bag when reaching station B from station A, actuates trip lever 109 which effects closing of switch 128 and the energization of solenoid 94, whereby the latch 87 releases the scale beams 69. Release of the scale beams from the latch causes the counterweight 82 to descend to its lowermost position, whereby the weighing platform 50 moves into engagement with the bag bottom and lifts the under weight bag out of engagement with the moving conveyor belt to the position shown in Figure 14.

Simultaneously, the circuits are closed to the bulk feeder 107 and dribbler 108, whereby said feeder and dribbler are set into operation to deliver the necessary additional material into the open bag top to bring the weight of the contents of the bag up to the required full measure. As the bag, counterweight 82, and scale beams 69 gradually settle to a balanced condition, just before the bag has received its full measure, the bulk feeder cuts off, but the dribbler continues to function until the bag has received its full weight. This is effected when the bag descends from the dotted line position in Figure 14 to the full line position shown therein, in which position the filled bag and the scale beams come to rest in a balanced condition. Should the parts be slightly out of balance, the auxiliary weight 57 may be shifted upon the scale beam 53 to compensate for any defects which may cause such unbalance of the scale beam.

If paper bags are to be filled and closed, which require a strip of sealing tape to be applied over the top edges of each flattened bag top just prior to stitching together the bag top walls, the operator shifts the selector switch 181, from its neutral position N, to position P, whereby the circuit for sewing head 163 (station D) is conditioned for operation. He next depresses foot pedal 98 which opens switch 182 and interrupts the supply of electric current to the conveyor motor 183, which stops the conveyor belt. Such interruption of the supply of current to the conveyor motor 183 is effected through a magnetic starter of well known construction, diagrammatically illustrated in Figure 19, and designated by the numeral 184.

Depression of the foot pedal 98 moves the terminal 105 of arm 103 into engagement with the stud or projection 106 on the scale platform 50, and thereby moves the scale platform to its depressed or lowered position, shown, in Figure 5, whereby the filled bag is delivered onto the conveyor. At the same time the latch 87, by the action of spring 95, is moved into locking engagement with the cross rod 97 of the scale beams 69, and thereby secure the weighing platform 50 in its depressed position, shown in Figures 5, 10 and 13. The bag is then momentarily supported on the interrupted conveyor during which period the operator may manually condition the bag top for closing at station D.

When the bag top walls have been brought into flatwise relation, the operator releases the foot pedal 98, whereby switch 182 is closed to start motor 183 and the conveyor 4. As the conveyor resumes operation the bag is advanced to station D, in the event of a paper bag, and at the same time the operator guides the flattened bag top walls into engagement with a strip of tape 185, which is folded over the bag top walls by a suitable folder, as indicated in Figure 19. As the bag is advanced by the conveyor the leading end of its top engages a depending finger 189 of a switch closer 188, mounted over the path of travel of the bags as will be understood by reference to Figure 19.

When the bag top engages finger 189, switch 188 closes switch 186, whereby a circuit to the solenoid operating clutch of the sewing head 163 is completed, provided switch 191 in wire 192 has been manually closed by manipulation of a small foot pedal 190, indicated in Figures 1, 2, 5 and 6. The mechanical connections between switch 191 and foot pedal 190 are not shown in the drawings. As the bag passes through station D, the tape 185 is folded over the bag top wall and secured thereto by the row of stitches applied to the bag top by sewing head 163, after which the tape and thread are severed by suitable means, not shown in the drawings. When the closed bag top moves out of engagement with finger 189, the switch closer 188 returns to its normal switch-opening position whereby the switch 186 opens and interrupts the supply of current to motor 177 of sewing head 163. When textile bags are to be filled and closed, the operator shifts selector switch 181 to position T, shown in Figure 19, whereby a circuit is completed to motor 176 of the sewing head 162 to condition said sewing head for operation. As soon as the shortweight bag is delivered onto the conveyor from the packer at station A, the conveyor transfers the bag to station B where the bulk feeder 107 and dribbler 108 deliver the necessary material into the shortweight bag to bring its contents up to full weight. The operator then closes switch 191 by manipulation of the foot pedal 190, whereby the circuit to the magnetic clutch of sewing head 162 is energized and starts sewing head 162 to operate. The bag top is then manually fed through sewing head 162 and the bag top closed, as will be understood by reference to Figure 19. Sewing head 162 comes to rest when the operator removes his foot from the foot pedal 190, which permits switch 191 to return to its normal closed position.

The various control circuits of the apparatus herein disclosed are shown electrically connected to a 110 volt, single phase line, which includes conductors 193 and 194. Conductor 193, the ground of the circuit as here shown, is electrically connected to wire 132 which, it will be noted by reference to Figure 19, has one end connected to a mechanically held relay 195. Relay 195 comprises a coil 196 to one end of which the wire 132 is connected. Wire 197 is connected to the opposite end of coil 196 and connects said coil to conductor 194. Suitable start and stop switch 198 and 199, respectively, are interposed in the starter circuit as, for example, in the wire 197. A wire 201 connects wire 197 to a contact 202 of a switch 203 comprising dual switch contacts adapted to electrically engage a pair of complemental fixed contacts to which the wires 136 and 201 are connected. A wire 204 electrically connects the movable contact of stop switch 199 with the movable contact of switch 203.

Figures 20 to 27, inclusive, illustrate a bag filling and closing machine of slightly different construction wherein the scale beam is actuated by pneumatic means controlled by a plurality of switch elements, diagrammatically illustrated in Figures 27–A and B.

Figure 24:
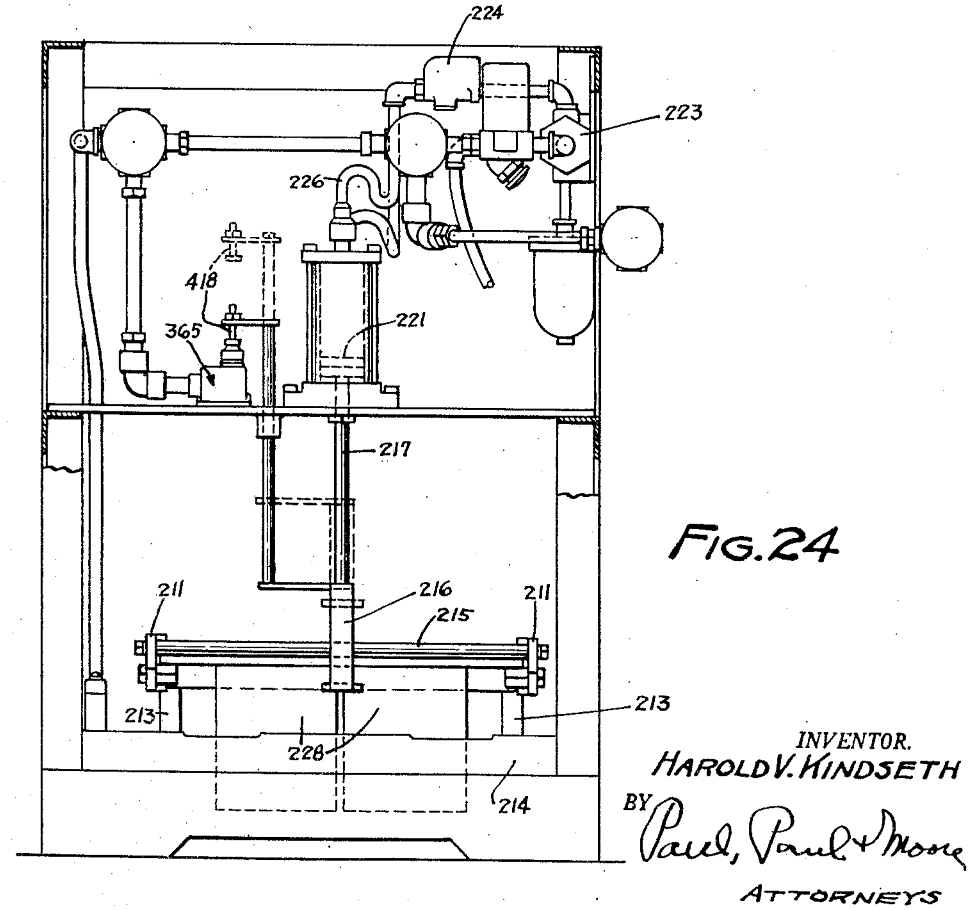
Figure 24 is a view looking at the machine from the rear thereof partially broken away to more clearly illustrate the parts thereof.

The scale platform, generally described by the numeral 205, is shown comprising longitudinally extending bars 206, 207, and 208, secured to a supporting structure 209 pivotally mounted at the outer ends of a pair of spaced scale beams 211 pivoted on knife edge pivots 212 supported in suitable brackets 213 secured to the base 214 of the machine frame as illustrated in Figure 24. The knife edge pivots 212 are similar to the corresponding pivots of Figures 5 and 6.

A cross rod 215 is secured to the rear ends of the scale beams 211 and passes through a box-like operating member 216 secured to a piston rod 217. A pneumatic cylinder 218 is shown mounted on a plate or platform 219 of the machine frame, directly above the rear end portions of the scale beams. A piston 221 is secured to the piston rod 217 within the cylinder and is adapted to impart reciprocal movement to the operating member 216, thereby to shift the scale beams from their lowered position, indicated in Figure 20, to its elevated position shown in Figure 22. A conduit 222 has one end connected with the lower end of cylinder 218 and leads therefrom to a solenoid operated control valve 223, shown in Figures 23 and 28. An adjustable free flowing check valve 224 of conventional construction is interposed in the conduit 222, and a similar adjustable free flowing check valve 225 is interposed in a conduit 226 also having one end connected to the control valve 223 and its opposite end to the top end of the cylinder 218.

Figure 20:
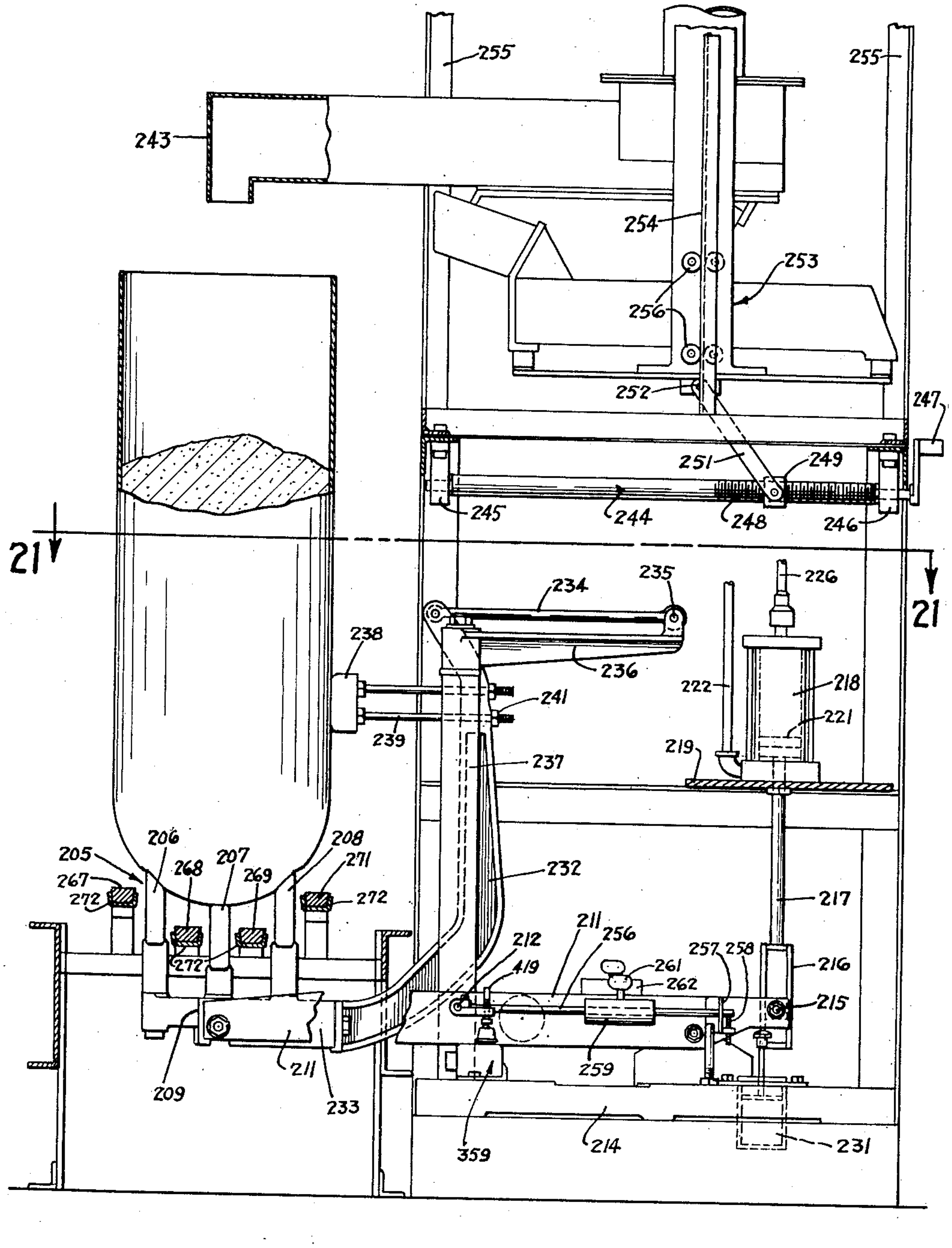
Figure 20 is a view somewhat similar to Figure 14 but showing a slightly modified construction wherein certain of the control elements are pneumatically operated.
Figure 21:
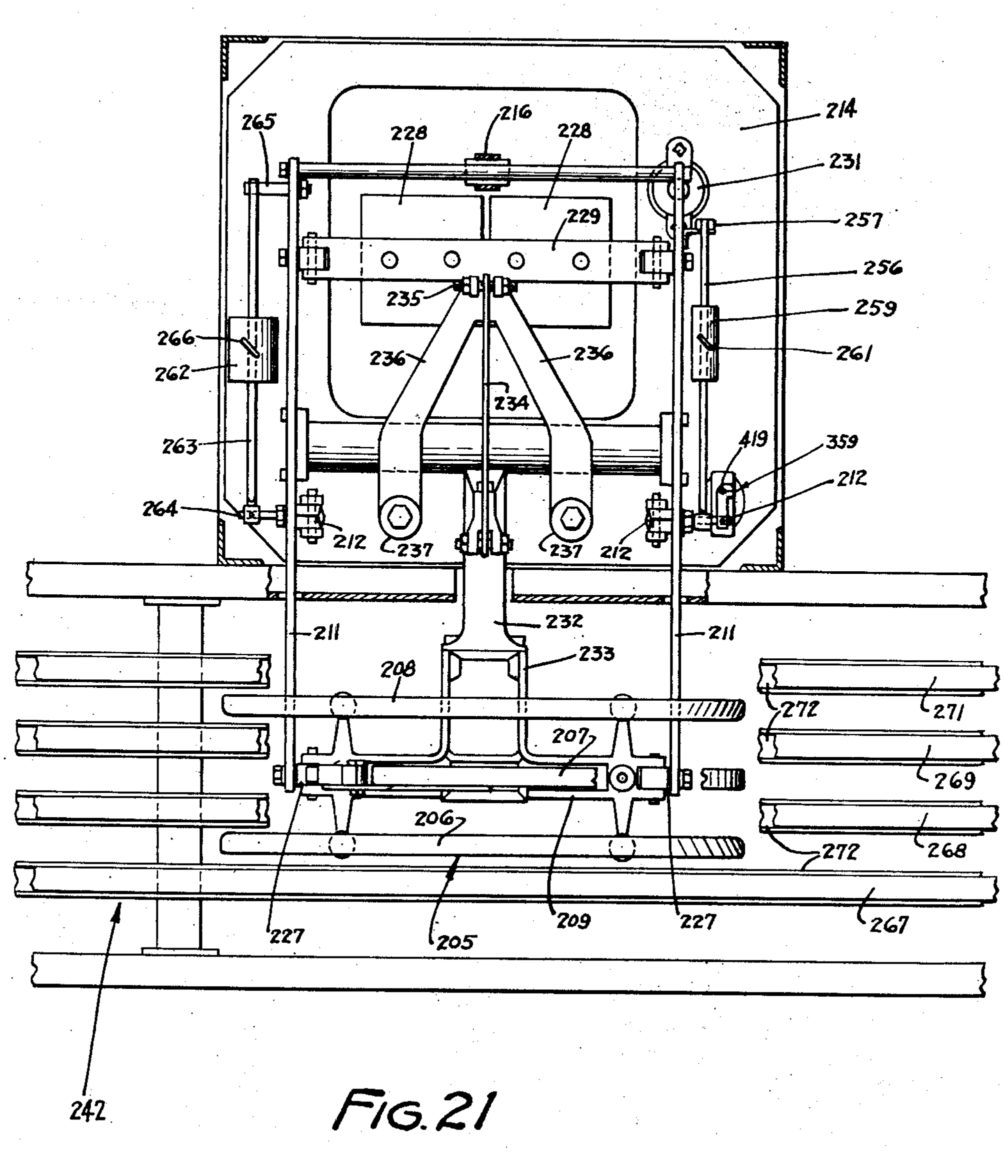
Figure 21 is a sectional plan view substantially on the line 21—21 of Figure 20 with some of the parts omitted.

The scale beams 211 operate in a manner very similar to the scale beams 69 in the previous figures, in that they are adapted to pivot on the knife edge pivots 212 shown in Figure 21, and the member 209 which supports the weighing platform 205 is pivoted to the forward ends of scale beams 211 by knife edge pivots 227. Counterweights 228 are suspended from a cross member 229 having its ends pivotally secured to the scale beams 211 as best illustrated in Figure 21. A dash pot 231 is mounted in the machine frame adapted to be engaged by one of the scale beams 211, thereby to cushion the descent of the scale beams from their elevated to their lowered positions, shown in Figures 22 and 20, respectively, when the air is released from beneath the piston 221.

Figures 22, 23:
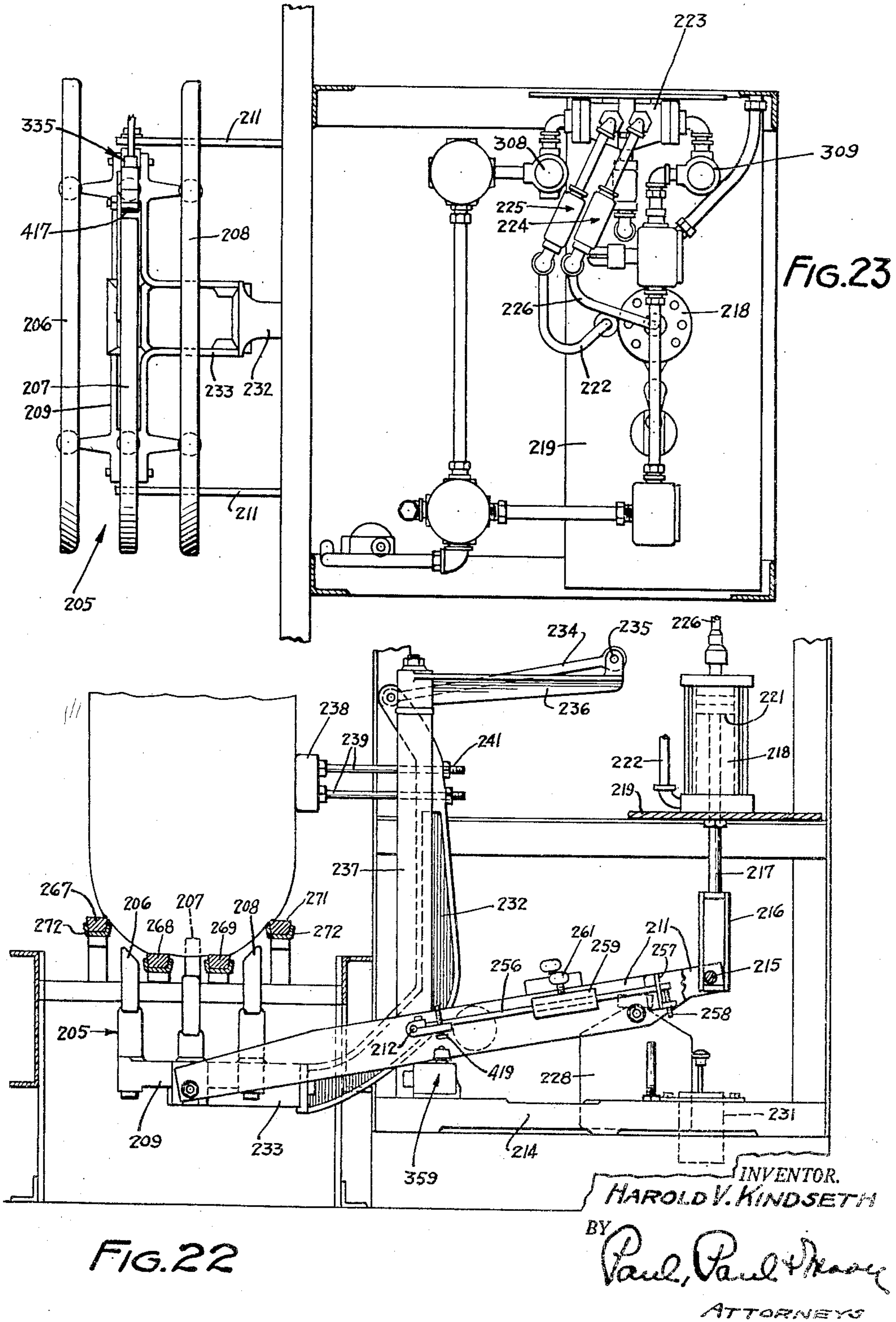
Figure 22 is a view similar to Figure 20 showing the rear or weighted end of the scale beam elevated to lower the bag body on the conveyor.
Figure 23 is a fragmentary vertical sectional view showing some of the control elements.
Figure 25:
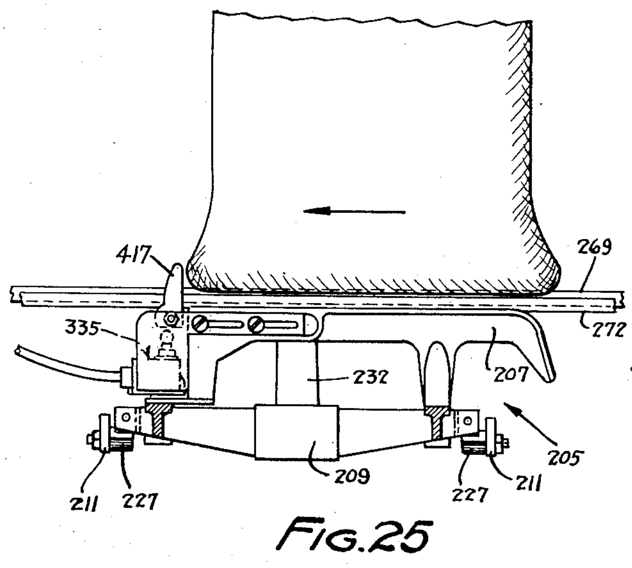
Figure 25 is a view showing the switch operating lever mounted in the path of bags adapted to be engaged by the lower end corner of each bag body thereby to effect the release of the scale beam when the filled bag reaches station B thereby to elevate the bag out of engagement with the conveyor, the trip lever being shown about to be engaged by the bag.
Figure 26:
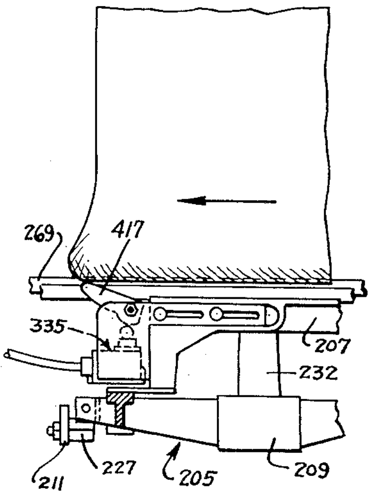
Figure 26 is a view similar to Figure 25 showing the trip actuated by the bag body.

To maintain the bars 206, 207 and 208 of the scale platform 205 in their proper positions, a stabilizing arm 232 has one end secured to a rearward extension 233 of the supporting member 209. The upper end of the arm 232 is pivoted to one end of a rod 234 having its opposite end pivoted at 235 to the rear end portion of a fork-like arm 236. The forward end portions of the arms 236 are secured to suitable upright posts 237, as best illustrated in Figures 20, 21, and 22. A supporting bar 238 is shown secured to the ends of a pair of spaced rods 239 having their rear end portions secured in the arm 232, as illustrated at 241 in Figures 20 and 22. The arm 232 and link 234 cooperate to maintain the scale platform 205 in proper relation to the conveyor 242, as shown in Figures 20 and 21.

An endless conveyor 242, similar to the conveyor 4 in the previous figures, is mounted to receive the bag from the packer and transfer it from loading station A to station B, beneath a dribbler 243 of the usual vibratory type. This dribbler, like dribbler 108, delivers added material into the short weight, unclosed bag, if additional material is required to bring the weight of the bag contents up to full measure. The dribbler which may be of conventional design, as above stated, is provided with means whereby it may be vertically adjusted to adapt it to the height of the bags being filled.

Such adjusting means is shown comprising a horizontal shaft 244 mounted in bearings 245 and 246 and having a crank 247 at one end for rotating the shaft 244. One end of the shaft 244 is threaded, as indicated at 248, and a nut 249 is mounted on said threaded portion and has one end of a link 251 pivoted thereto. The opposite end of the link is pivoted at 252 to the dribbler body 253 which, as will be understood by reference to Figure 20, is vertically adjustable on fixed guides 254 provided in the frame portion 255 of the machine frame. Anti-friction rollers 256 may be provided on the dribbler body 253, as shown, to minimize friction between the dribbler body and guides 254.

The scale beams 211 are provided with means for causing the rear end portions thereof to quickly start their upward movement, when air is admitted into the bottom of the cylinder from the control valve 223. Such means is shown comprising a rod 256, corresponding to rod 156 in Figures 6 and 14, having one end pivoted to one of the central pivots 212 of the scale beams and its opposite end resting in a keeper 257. Keeper 257 has an adjusting screw 258 for adjustably supporting the adjacent end of the rod 256 on the adjacent scale beam 211. A weight 259 is slidable on the rod 256 and has a locking screw 261 for locking it in adjusted position on the rod.

Means is provided in conjunction with the scale beams and platform for balancing said parts in the event the scale beam may be out of balance when the correct weight or volume of material has been introduced into the bag, and the filled bag and counterweight 228 are in their balanced positions illustrated in Figure 20. Should the scale beam be out of balance because of a discrepancy in the construction of the parts, a weight 262 is shown slidably mounted on a rod 263 supported on the adjacent scale beam by suitable studs 264 and 265. A lock screw 266 is mounted in the weight 262 for locking the weight in adjusted position upon the rod 263. The weight 262 serves only to correctly balance the parts, when a completely filled bag is positioned upon the scale platform and the bag is out of engagement with the conveyor 242, as shown in Figure 20. The conveyor is shown comprising a plurality of V-belts 267, 268, 269 and 271 disposed in a manner similar to the conveyor belts 6 to 9, inclusive, shown in Figures 1 and 2.

These belts are mounted on suitable pullies 260 and 270, as indicated in Figures 27–A and 27–B. The load carrying strands of said belts are shown supported in channels 272 fixed in the frame of the machine.

*Bag filling mechanism*

One of the important features of the structure shown in Figures 20 to 27–B, inclusive, resides in the means provided in connection with the packer for introducing the initial charge of material into each bag against a predetermined air pressure. As best illustrated in Figure 27–B, an empty bag 273 is fitted over the usual packer tube 274 and as its upper wall portions secured thereto by a suitable bag holder, generally designated by the numeral 275, shown comprising opposed grippers 276 and 277. The grippers 276 and 277 are actuated by a pneumatic device 278 comprising a cylinder 279, having a double acting plunger therein, not shown, connected with the grippers 276 and 277, whereby when air introduced in the cylinder 279, the grippers are actuated to grip the bag top walls. When the air is released from the cylinder 279 the grippers are retracted and release the bag top from the packer tube, whereby the filled bag may be delivered onto the conveyor 242, as will be understood by reference to Figure 27–B.

In conventional packers the material is usually delivered into the empty bag by gravity, or by an auger mounted within the packer tube. In accordance with the present invention, the material is delivered into the bag suspended from the packer tube against air pressure, whereby the volume of material introduced into the bags may be varied by varying the pressure of the air against which the material is introduced into the bag.

To thus deliver the material into the bag against air pressure, a cylinder 281 is shown having a piston 282 therein provided with a piston rod 283 shown operatively connected to the bag holder by a cable 284, as indicated in Figure 27–B. Air is supplied to the upper end of the cylinder 281 by a conduit 286, leading from a solenoid-operated control valve 285. The opposite or lower end of the cylinder 281 is connected to the opposite end of valve 285 by a conduit 287. The plunger 288 of the valve 285 is operated in one direction by a solenoid-operated air release valve 289. Said solenoid coil has a wire 291 connecting one end thereof to a ground wire 292, corresponding to ground wire 132 on Figure 19. The opposite end of said solenoid coil has a wire 293 connecting it to a fixed contact 294 of a suitable switch 295.

Switch 295 is shown provided with a movable contact 296 which normally is in electric engagement with a fixed contact 297. The movable contact 296 has a wire 298 electrically connecting it to the other conductor 194′ of the control circuit, shown in Figures 27–A and B. Wire 292 is connected to conductor 193′ constituting the ground side of the control circuit. Fixed contact 297 of switch 295 has a wire 302 connecting it to a magnetic starter 303 of conventional design, which controls the operation of an electric motor 304 which operates the packer tube auger.

The bag holder cylinder 278 is shown having conduits 305 and 306 connecting it to the opposed ends of a control valve 307, similar to control valve 223 which controls the supply of air to and from the cylinder 218. The control valve 307 is operated by solenoid-operated valves 308 and 309 electrically connected in a wire 311 having one end electrically connected to one end of coil 312 of the magnetic starter 303 for the packer motor 304. The other end of wire 311 is connected to a fixed contact 313 of a switch 314 which has a movable contact 315 connected by a wire 316 to wire 298.

Air is supplied to the bag holder cylinder 278 and the control valves 223, 285 and 307 from an air tank 317 having a pipe 318 connecting it to a source of air supply, not shown in the drawings. A suitable pressure regulator 319 is provided in the conduit 318 for maintaining substantially a constant air pressure in the air tank 317. Control valve 223 is supplied with air under pressure from a conduit 321, which is in communication with a conduit 322 having one end connected to tank 317 and its opposite end to control valve 285. Valve 307 has a conduit 323 connecting it to conduit 321.

*Control valves*

The control valves 223 and 307 are similar in construction, and control valve 285 is of the same general type. These valves are electrically operated by solenoid operated air release valves as hereinbefore described. Control valves are electrically operated, and to facilitate explanation, valve 223 is diagrammatically illustrated in Figure 28. Each such valve comprises a body 327 having a bore therein for receiving a double acting piston generally designated by the numeral 328. Said piston comprises a shaft-like member 329 having spaced discs 331 and 332 secured thereto for controlling the directional flow of air through the valve. Air supply pipe 321 delivers air under pressure into the chamber within the valve body from air supply tank 317, and reciprocation of the piston 328 within the valve chamber is effected by the operation of the solenoid operated air release valves 308 and 309, when the latter are alternately energized and de-energized.

*Electric control*

The electric controls of the apparatus are shown in Figures 27–A and 27–B, and include a 110-volt, single-phase line, similar to the one shown in Figure 19. This control line includes conductors 193′ and 194′ which are connected to a source of electric energy, not shown. Conductor 193′ constitutes the ground connection, and has a wire 333 connecting it to wire 325, which is electrically connected to one side of the coil 196′ of a magnetically held relay 195′, similar to the one shown in Figure 19. The opposite end of wire 325 is connected to the magnetic starters 178 and 179 of sewing heads 162 and 163, and the magnetic starter 184, respectively, as illustrated in Figure 27–A. Wire 197′ leads from coil 196′ through switches 198′ and 199′ to a movable contact 334 of a multiple contact switch, generally designated by the numeral 335. See Figure 27–A. The magnetically held relay 195′ has a double pole switch 203′, the movable contacts of which are adapted to electrically engage contacts 202′ and 200, when coil 196′ is energized. The movable contacts of switch 203′ have a wire 204′ electrically connecting them to wire 197′ adjacent to switch 199′. Terminal 202′ is also shown electrically connected to wire 197′ by wire 201′.

Switch 335 comprises fixed contacts 336 and 337, electrically connected to movable contacts 338 and 339, respectively, of a mechanically held relay, generally designated by the numeral 341. The relay 341 comprises fixed contacts 342 and 343 alternately engageable with their respective contacts 338 and 339, shown carried on a movable bar 344 adapted to be longitudinally shifted from one position to the other by toggles 345 and 346, respectively. This will be understood by reference to the wiring diagram shown in Figure 27–A.

The toggles of the relay 341 are arranged to be operated by solenoids 347 and 348. The fixed contact 342 is electrically connected to one end of the solenoid coil 348 by a wire 349, and a wire 351 similarly connects fixed contact 343 to one end of solenoid coil 347. A wire 352 connects together the opposite ends of the solenoid coils 347 and 348, and wire 353 connects said solenoids to wire 354, having one end connected to ground wire 193′ and its opposite end to the vibrating mechanism of a suitable dribbler of conventional construction, generally designated by the numeral 243.

A second wire 356 electrically connects the dribbler with the fixed contact 357 of a control switch 358 having a movable contact 359 connected by a wire 361 to the wire 197′. The movable contact 359 is normally engaged with a fixed contact 362 having a wire 363 electrically connecting it to a fixed contact 364 of a safety switch 365, which also has a movable contact 366. The safety switch 365 is open when the scale beam is in cocked position, as shown in Figure 27–A. The scale beam is retained in cocked position by the pressure of the air delivered into the lower portion of the cylinder 218 below the piston 221. A wire 367 connects the movable contact 366 of switch 365 to the solenoids 309 and 308 of the control switch 223. A wire 368 connects solenoid 308 to a wire 349 of the mechanically held relay 341. Another wire 369 has one end connected to wire 367 between the solenoids 308 and 309 and the other end to wire 354.

A foot operated switch, generally designated by the numeral 371, has a movable circuit closer 372 connected to a suitable foot pedal, not shown, whereby the operator may manipulate the circuit closer to effect operation of the selected sewing head, when a bag is advanced to the sewing head to have its open top closed.

The circuit closer is shown comprising a lower contact-bridging member 373 which normally closes the gap between contacts 374 and 375, whereby a circuit is normally conditioned to the cutter head 163 for sewing the tops of paper bags. When cutter head 162 is to be utilized for sewing the top of a textile bag, the circuit closer 372 is moved upwardly to cause its intermediate contact-bridging member to bridge a pair of contacts 376 and 377, and simultaneously the upper contacts 378 and 379 are bridged by a similar member 381 of the circuit closer 372.

Lower contact 375 is connected by a wire 382 to the fixed contact of switch 186 of sewing head 163, and its complemental contact 374 has a wire 383 connecting it to one end of the coil of starter switch 179 of sewing head 163. A second wire 384 connects contact 374 with the contact 385 of a selector switch, generally designated by the numeral 386. Contact 377 of circuit closer 372 is connected by a wire 387 to one side of the solenoid of the clutch of sewing head 162, and the other side of said solenoid is connected to the ground wire 325 by a wire 388. Contact 376 is connected by a wire 389 to the fixed contact 391 of selector switch 386, and a short wire 392 connects contacts 376 and 378. A wire 393 connects contact 378 to the coil of the magnetic starter 178 for sewing head 162, and its complemental contact 379 is connected by a wire 394 to the fixed contact 395 of selector switch 386. A wire 396 connects contact 397 of switch 386 to wire 382.

To complete the circuits for the selector switch 386, contacts 398 and 399 are connected by wire 401, and wire 402 electrically connects said contacts 398 and 399 to the fixed contact 200 of the magnetically held relay 195'. In like manner, contacts 403 and 404 are connected by wire 405, and a wire 406 electrically connects said contacts to the lower end of the coil of the mechanical starter switch 184 of the conveyor motor 183.

*Operation*

In the operation of the novel apparatus illustrated in Figures 20 to 28, inclusive, and assuming that textile bags are to be filled and closed, an empty bag is fitted onto the packer tube 274 and pendently secured thereto by manipulation of the pneumatic grippers 276 and 277. These grippers are actuated when a circuit is completed to the solenoid 308 of control valve 307. This solenoid, it will be noted, has a wire 407 connecting it to one end of the coil 312 of the mechanical starter 303 of the packer motor, and is in electric connection with a wire 408, leading to a movable contact 409 of a foot operated switch 411, shown in Figure 27–B. A wire 412 connects the fixed contact 413 of switch 411 to wire 302 whereby a circuit is completed to the solenoid 308 through wires 193, 293, 414, 407, 408, movable contact 409, fixed contact 413, wire 412, wire 302, closed contact switch, contacts 297, 296, and wire 298 to conductor 194'.

Simultaneously, as the control valve 307 is actuated to deliver air to the bag grippers, control valve 285 is operated to deliver air into the upper portion of cylinder 281. This results shortly after the bag starts to descend under the influence of the packer. Shortly after the bag and the bag holder have started their downward movement, a projection 415 on the bag holder supporting frame engages the movable contact 296 of switch 295, which opens the circuit through wire 302, but immediately moves the movable contact 296 into engagement with fixed contact 294 which completes a circuit to the solenoid 289 as follows: from conductor 193' through wires 292 and 291, solenoid 289, wire 293, contacts 294 and 296 of switch and wire 298 to conductor 194'.

Simultaneously, as the packer auger starts to deliver material into the empty bag, a circuit is closed to the conveyor motor whereby the conveyor is started. As the material is delivered into the bottom of the bag, the bag gradually fills and then begins to move downwardly on the packer tube against the air pressure above the piston 282 in cylinder 281. This pressure is adjusted to a pre-determined figure and is maintained constant as a result of the air storage tank 317 and the pressure regulator 319 interposed in the pipe 318 connecting the tank to a source of air supply, not shown. When the bag has received a pre-determined charge, a projection 416 on the bag holder supporting frame engages the movable contact of switch 314 and closes a circuit through solenoid 309 of control valve 307, whereupon the bag holder parts are actuated to release the bag top and the filled bag is then delivered onto the conveyor, and advanced from station A to station B where the lower leading corner of the bag engages a trip lever 417 similar to trip lever 109 in Figure 19.

Actuation of trip lever 417 closes a circuit through the lower contacts of switch 335 whereby a circuit is established through solenoid 308 of the main control valve 223. Energization of solenoid 308 causes pump 328 of valve 223 to shift to the left as shown in Figure 28, whereby the air pressure is released from the cylinder 218 below the piston 221, which permits the counterweight 228 and scale beams to drop to their lower positions shown in Figure 20. As the scale beams are lowered, a switch actuating member 418, carried by the box-like member 216 secured to the lower end of the piston, effects the closing of safety switch 365, and simultaneously a detent 419 on the scale beam engages the movable contact of switch 358 and opens a circuit through contacts 359 and 362. At the same time, however, the movable contact 359 is moved into electric engagement with contact 357 whereby a circuit is established to the dribbler, as will readily be understood by reference to Figure 27–A.

The short-weight bag is moved out of engagement with the conveyor and into its elevated position beneath the dribbler 243, when the air is exhausted from the lower portion of the cylinder 218. The dribbler immediately commences its function to deliver material into the bag until the weight of its contents is brought up to full measure.

When the bag has received its full charge from the dribbler, the detent 419 on the scale beam permits the movable contact 359 of switch 358 to complete a circuit through contact 362, wire 363, closed switch 365, and solenoid 309, which shifts the piston 328 of valve 223 to a position to open the valve to conduit 222, or, in other words, to establish communication between conduits 222 and 321 through valve 223. When valve 223 is thus actuated, air under pressure is delivered into cylinder 218 below piston 221, whereby the latter is quickly moved to the position shown in Figure 27A, and thereby elevates the weighted end of the scale beam and cocks the scale beam in such position by air pressure. See Figure 22. Such actuation of the scale beam returns the filled bag to the conveyor, which passes it to the sewing head 162 at station C of Figure 1, to have its top sewed, as hereinbefore described.

Before the filled bag reaches station C, the operator must shift the selector switch 386 so that the contact bridging member of switch 386 will close the gap between contacts 391–399, and 395–404, thereby conditioning a circuit for the magnetic clutch of sewing head 162. The operator also manipulates a foot pedal to shift the contact bridging member 381 of switch 372 from the position shown in Figure 27A into engagement with contacts 376—377 and 378—379, which energizes the clutch of sewing head 162 to operate the needle.

It will thus be seen that the operation of the machine is substantially automatic. If textile bags are to be filled and closed, as illustrated in Figures 27A and 27B, the selector switch 386 is shifted to position T, and when the bag has received its full charge and is delivered onto the conveyor, the operator shifts the contact bridging member of switch 372 to its upper position by manipulation of the foot pedal connected therewith. This foot pedal is not shown in the drawing. It is to be understood, however, that said foot pedal is conveniently located in front of the machine, whereby it may be manipulated by the operator as he stands in front of the machine and guides the bags from station B to station C, where each bag top is sewn its full length to close the bag.

The novel machine herein disclosed may be utilized for filling large bags regardless of the material from which they may be constructed, provided the tops thereof are capable of being sewn by the sewing heads 162 or 163. It will also be noted that the machine may be utilized for applying a strip of sealing or reinforcing tape over the top edges of the bag top walls of each bag, simultaneously, as said walls are stitched together by the sewing head 163.

Another highly desirable feature of the present machine resides in the novel manner of retaining the scale platform in horizontal position regardless of its position vertically. The pneumatic feature as applied to the bag holder and the packer tube, is also of importance in that the form of control valves used for directing the air under pressure to the cylinder 279 of the bag holder and also the cylinder 281 of the bag holder is arranged for automatic operation. Also, by interposing a tempering tank 317 in the conduit 322, the pressure regulator valve 319 may be adjusted to maintain a constant pressure in tank 317 and therefore in cylinder 281, whereby the packing of the flour into the bag by the packer auger is resisted by air pressure. Because of such pressure being variable the resistance against which the flow of material is packed into each bag may readily be varied to suit the particular material being packaged by adjustment of regulator valve 319.

When filling and closing multiwell paper bags requiring a strip of sealing tape to be applied thereto, such tape is usually applied to the bag top to prevent the stitches from pulling through the paper, and it is therefore not necessary to apply an adhesive to the bag top or tape to bond the tape thereto. There may be instances where it would be desirable to secure the tape to the bag top walls by an adhesive, but ordinarily this is not required.

The foregoing detailed description has been given for clearness of understanding only, and no unnecessary limitations should be understood therefrom, but the appended claims should be construed as broadly as permissible in view of the prior art.

I claim as my invention:

1. In a bag filling and closing machine, a conveyor, a packer for delivering a short weight charge into a bag and delivering the partially filled bag on to the conveyor, a scale platform embodied in the conveyor and normally disposed beneath the surface thereof, a pivoted scale beam having one end secured to the scale platform, a counterweight secured to the opposite end of the scale beam, a latch normally retaining the weighted end of the scale beam in elevated position whereby the scale platform is disposed beneath the surface of the conveyor, a dribbler disposed over the scale platform at an elevation above the bag top, operating means for the dribbler, and a trip lever positioned to be engaged by the advancing underweight bag, whereby when the bag comes to a position over the scale platform, said trip is actuated to effect the release of the scale beam from the latch, whereby the scale platform is automatically elevated to lift the underweight bag out of engagement with the conveyor to a position beneath the dribbler, and means for substantially simultaneously starting the dribbler, thereby to deliver additional material into the underweight bag to bring its contents up to the full measure, and means for discontinuing the operation of the dribbler when the said bag contents reach full measure.

2. A bag filling and closing machine as defined in claim 1, characterized by a bulk feeder adapted to operate in conjunction with the dribbler to quickly add the major portion of the necessary additional material required to bring the contents of the bag up to full measure.

3. A bag filling and closing machine as defined in claim 2, whereon means is provided for interrupting the operation of the bulk feeder before the bag has received its full measure.

4. A bag filling and closing machine as defined in claim 2, wherein the dribbler and bulk feeder are electrically operated and have electric circuits connecting them to a source of current supply, normally open switches being interposed in said circuits adapted to be closed by pivotal movement of the scale beam when released from said latch whereby to automatically start the dribbler and bulk feeder each time an under-weight bag is lifted off the conveyor by the scale platform, and means for automatically opening the circuit to the dribbler and bulk feeder, when the bag has received the necessary additional material to bring the weight of its contents up to full measure.

5. In a machine of the class described, a conveyor comprising a plurality of spaced parallel endless belts, a bag filling station including a packer for delivering a short weight charge into each bag positioned thereon, a second station for lifting the under-weight bag from the conveyor and delivering additional material into the bag to bring the weight of its contents up to full measure, means for automatically interrupting the delivery of additional material into the bag when said bag has received its full measure, manually operable means for controlling the operation of the conveyor, and means whereby the conveyor may transfer the bag from said second station.

6. A bag filling and closing machine as defined in claim 5, wherein dual sewing heads are provided at a station succeeding said second station, one for sewing the tops of paper bags, and the other for sewing the tops of textile bags, and means whereby the operation of said sewing heads is effected by the passage of the bags through the machine.

7. In a machine of the class described, a conveyor composed of a plurality of spaced parallel belt strands cooperating to provide a carrying surface for the bags, a packer having a tube having means for supporting a flexible walled bag thereon, said packer tube having means to deliver a short weight charge into each bag, a scale platform normally positioned beneath the load carrying surface of the belt and secured in such position by a magnetically operated latch, a control circuit for the solenoid operated latch member having a normally open switch therein, a trip lever normally disposed in the path of the advancing short weight bag body, said trip lever being actuated by the bag body to automatically effect the closing of said switch whereby the solenoid actuated latch is operated to release the scale platform, and permit it to lift the bag out of engagement with the moving conveyor at a succeeding station, and means at said succeeding station for introducing additional material into the open bag, thereby to bring the weight of the bag contents up to full measure and means for discontinuing the operation of the means for introducing additional material when the bag contents reach full measure.

8. A bag filling and closing machine as defined in claim 7, wherein a pedal is provided for lowering the platform into cocked engagement with the latch beneath the load carrying surface of the conveyor.

9. A machine for filling and weighing bags as defined in claim 8, wherein the foot pedal is positioned for manipulation to restore the scale platform to its position beneath the conveyor, and to simultaneously interrupt operation of the conveyor.

10. The subcombination of an endless conveyor, a packer having means for delivering a pre-determined short weight charge into a bag positioned thereon, a scale platform normally positioned below the load carrying surface of the conveyor, a pivoted scale beam supporting the scale platform, a counterweight secured to the scale beam for elevating the scale platform to lift the under-weight bag out of engagement with the conveyor belt, a solenoid operated latch engageable with the scale beam to lock the scale platform in its depressed or lowered position, a motor for driving the conveyor having an electric circuit, a switch in said circuit, a manually operable member for lowering the scale platform into its depressed or lowered position and simultaneously opening said switch to interrupt the conveyor.

11. In a machine of the class described, a conveyor, a packer having means for delivering a pre-determined shortweight charge into a bag and positioning the filled bag on said conveyor, a scale platform normally positioned in the path of the bags beneath the loading carrying surface of the conveyor, a pivoted scale beam supporting the scale platform, a counter-weight secured to the scale beam for elevating the scale platform to lift the under-weight bag out of engagement with the conveyor belt, when the bag reaches a pre-determined position in its travel, means for locking the scale platform in its depressed or lowered position, said scale platform having an upright stabilizing arm offset from its median plane, and a horizontally disposed link connecting the upper end of said arm to a fixed support whereby said link will maintain the scale platform in horizontal position regardless of its up-and-down movement.

References Cited in the file of this patent

UNITED STATES PATENTS

| | | |
|---|---|---|
| 636,762 | Conley | Nov. 14, 1899 |
| 870,050 | Robbins | Nov. 5, 1907 |
| 984,537 | Buschman | Feb. 21, 1911 |
| 1,199,561 | Joplin | Sept. 26, 1916 |
| 1,262,256 | Redd | Apr. 9, 1918 |
| 2,073,432 | Segebaden | Mar. 9, 1937 |
| 2,102,248 | Yeakel | Dec. 14, 1937 |
| 2,157,577 | Schroeder | May 9, 1939 |
| 2,244,718 | Long | June 10, 1941 |
| 2,376,810 | Richardson | May 22, 1945 |
| 2,436,983 | Vredenburg | Mar. 2, 1948 |
| 2,564,544 | Richardson | Aug. 14, 1951 |
| 2,578,189 | Johnston | Dec. 11, 1951 |
| 2,592,074 | Slusher | Apr. 8, 1952 |
| 2,637,458 | Fahey | May 5, 1953 |